United States Patent
Mehta et al.

(10) Patent No.: US 12,413,542 B2
(45) Date of Patent: Sep. 9, 2025

(54) ELECTRONIC MESSAGE SYSTEM WITH ARTIFICIAL INTELLIGENCE (AI)-GENERATED PERSONALIZED SUMMARIZATION

(71) Applicant: Microsoft Technology Licensing, LLC, Redmond, WA (US)

(72) Inventors: Kuleen Haresh Mehta, Sammamish, WA (US); Anton Oguzhan A. Andrews, Kirkland, WA (US); Poonam Ganesh Hattangady, Seattle, WA (US); Michael Francis Palermiti, II, Indian Wellls, CA (US); Caleb Whitmore, San Francisco, CA (US); Erich Jose Martino Pena, San Francisco, CA (US); Alan Mark Thomas, Woodstock, GA (US); Matthew David Wood, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/314,478

(22) Filed: May 9, 2023

(65) Prior Publication Data

US 2024/0314093 A1     Sep. 19, 2024

Related U.S. Application Data

(60) Provisional application No. 63/490,328, filed on Mar. 15, 2023.

(51) Int. Cl.
*H04L 51/063* (2022.01)
*H04L 41/16* (2022.01)
*H04L 51/234* (2022.01)

(52) U.S. Cl.
CPC ............ *H04L 51/063* (2013.01); *H04L 41/16* (2013.01); *H04L 51/234* (2022.05)

(58) Field of Classification Search
CPC ...... H04L 51/063; H04L 51/234; H04L 41/16
See application file for complete search history.

(56) References Cited

U.S. PATENT DOCUMENTS

| 7,602,382 B2 | 10/2009 | Ladas et al. |
| 2003/0028603 A1 | 2/2003 | Aktas et al. |

(Continued)

FOREIGN PATENT DOCUMENTS

| CN | 101441744 A | 5/2009 |
| CN | 109740133 A | 5/2019 |

(Continued)

OTHER PUBLICATIONS

Mehta, Ivan, "Shortwave email app introduces AI-powered summaries", Retrieved from: https://techcrunch.com/2023/03/01/shortwave-email-app-introduces-ai-powered-summaries/, Mar. 1, 2023, 9 Pages.

(Continued)

*Primary Examiner* — Tonia L Dollinger
*Assistant Examiner* — Mehulkumar J Shah
(74) *Attorney, Agent, or Firm* — Shook, Hardy & Bacon L.L.P.

(57) ABSTRACT

An electronic message computing system tracks new activity items that reflect activities that have not yet been seen by the user. A generative artificial intelligence (AI) model generates a digest summary that is provided to the user the next time the user accesses the electronic message system. The digest summary summarizes new activity. The generative AI model also generates importance summaries that summarize the importance of a particular activity to the user, and content summaries that summarize the content of an activity item (such as an electronic mail message). The (Continued)

electronic messaging system also assigns a priority to each new activity item and provides the summaries, along with a priority, to a client computing system. The client computing system conducts a user experience, navigating the user through the new activity items, based upon the priority assigned by the electronic message computing system.

20 Claims, 33 Drawing Sheets

(56) References Cited

U.S. PATENT DOCUMENTS

| | | | |
|---|---|---|---|
| 2006/0277258 A1 | 12/2006 | Goldfarb | |
| 2010/0064231 A1 | 3/2010 | Gupta | |
| 2011/0171936 A1* | 7/2011 | Khoury | H04L 51/224 455/412.2 |
| 2012/0149342 A1* | 6/2012 | Cohen | H04L 51/226 455/412.2 |
| 2017/0124038 A1 | 5/2017 | Upadhyay et al. | |
| 2018/0189857 A1* | 7/2018 | Wu | G06F 40/30 |
| 2019/0325084 A1* | 10/2019 | Peng | G06F 3/167 |
| 2020/0143247 A1* | 5/2020 | Jonnalagadda | G06N 3/044 |
| 2020/0396191 A1 | 12/2020 | Yang | |
| 2021/0357375 A1* | 11/2021 | Urdiales | G06N 3/08 |
| 2022/0309037 A1* | 9/2022 | Gutierrez | G06F 16/16 |
| 2023/0066403 A1* | 3/2023 | Matsuoka | H04L 51/234 |

FOREIGN PATENT DOCUMENTS

| | | |
|---|---|---|
| WO | 20180148125 A1 | 8/2018 |
| WO | 20220266967 A1 | 12/2022 |

OTHER PUBLICATIONS

International Search Report and Written Opinion received for PCT Application No. PCT/US2024/018585, Jun. 7, 2024, 16 pages.

* cited by examiner

FIG. 2

ELECTRONIC MESSAGE SYSTEM WITH ARTIFICIAL INTELLIGENCE (AI)-GENERATED PERSONALIZED SUMMARIZATION

CROSS-REFERENCE TO RELATED APPLICATION

The present application is based on and claims the benefit of U.S. provisional patent application Ser. No. 63/490,328, filed Mar. 15, 2023, the content of which is hereby incorporated by reference in its entirety.

BACKGROUND

Computing systems are currently in wide use. Some computing systems host applications, such as electronic mail applications or other electronic communication systems.

In such hosted systems, users interact with client systems to generate electronic messages, send the messages to one another, schedule meetings, engage in chat messaging, and perform other activities. Such hosted messaging systems also provide functionality for recipients to review and respond to electronic messages, respond to and interact with meeting requests, and perform other operations.

The discussion above is merely provided for general background information and is not intended to be used as an aid in determining the scope of the claimed subject matter.

SUMMARY

An electronic message computing system tracks new activity items that reflect activities that have not yet been seen by the user. A. generative artificial intelligence (AI) model generates a digest summary that is provided to the user the next time the user accesses the electronic message system. The digest summary summarizes new activity. The generative AI model also generates importance summaries that summarize the importance of a particular activity to the user, and content summaries that summarize the content of an activity item (such as an electronic mail message). The electronic messaging system also assigns a priority to each new activity item and provides the summaries, along with a priority, to a client computing system. The client computing system conducts a user experience, navigating the user through the new activity items, based upon the priority assigned by the electronic message computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 2, 3, 4, 5, 6, 7, and 8 show examples of user interfaces that illustrate a user experience showing a digest summary, importance summaries, and content summaries.

DETAILED DESCRIPTION

Figure 1:
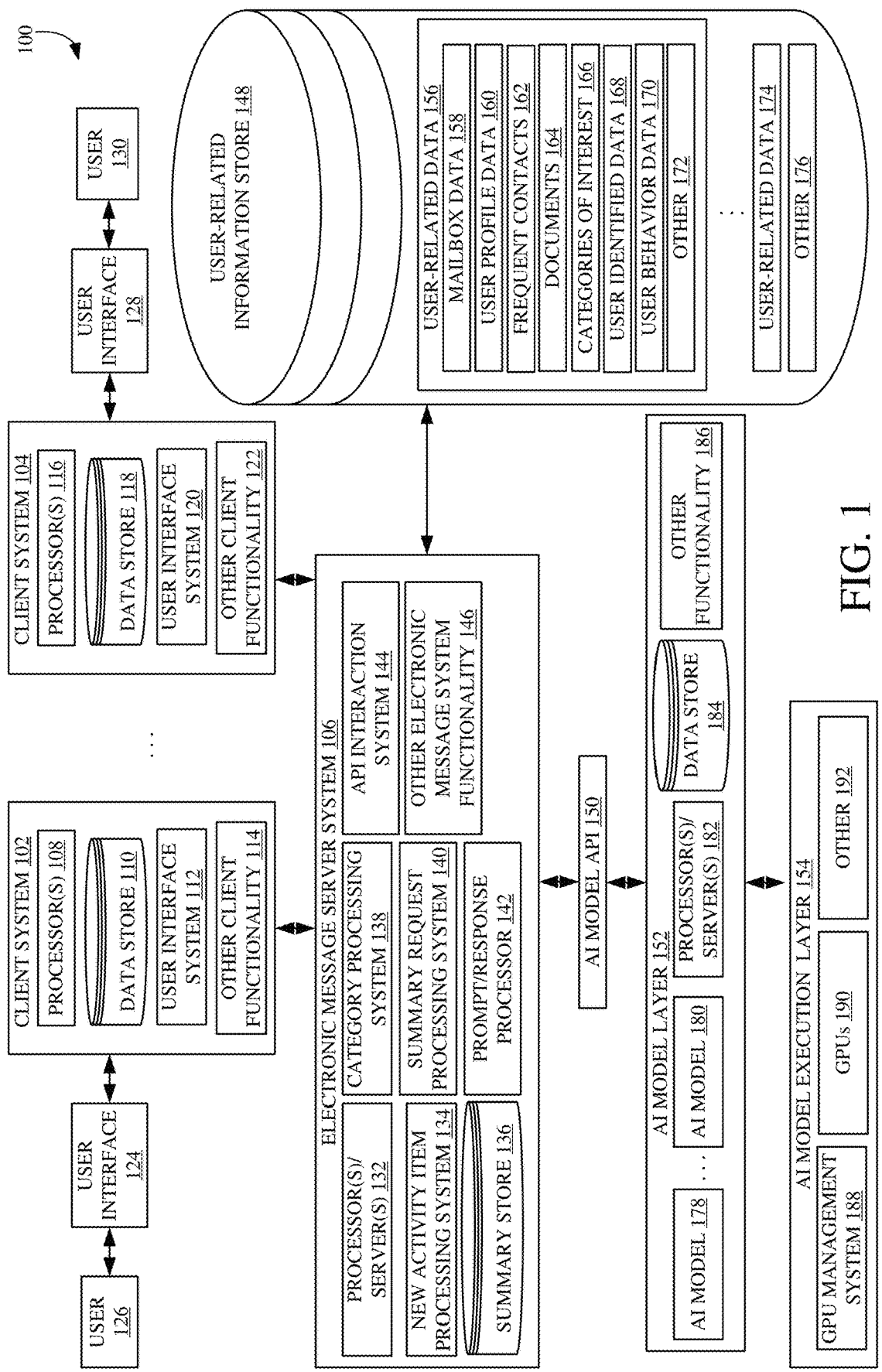
FIG. 1 is a block diagram of one example of a computing system architecture in which an electronic message server computing system is deployed.

As discussed above, electronic message systems can include electronic mail (email) systems, meeting scheduling systems, chat systems, and any of a wide variety of other electronic message systems. Such systems are very time-intensive ways of communicating and consuming information. Users often read messages individually, determine whether those messages contain information that is relevant to the user, and respond to such messages, when appropriate. This can result in a loss of productivity on behalf of the user, and it can also consume extra computing system resources. For instance, when a user needs to read a large number of electronic mail messages just to determine whether the messages are relevant to the user and/or require a response from the user, a large number of requests are sent to an email server to retrieve and display those messages for the user. When the user interacts with the message, such as to delete it, close it without response, or otherwise treat the message, this results in another call to the electronic mail server, thus consuming a relatively large amount of computing system resources, even for unimportant messages.

The present description thus proceeds with respect to an electronic messaging system (such as an email system) that detects incoming activity items (such as electronic messages, meeting requests, etc.) and assigns those activity items to a category of importance for the user. The categories of importance can be generated based on user-related information. A priority is also assigned to each activity item and to each category of interest. The activity items are also summarized using a generative artificial intelligence (AI) model. When the user next logs into or otherwise accesses the electronic message system, the user may be presented with a digest summary that summarizes all unseen activity that is of a relatively high priority to the user, and a priority navigation actuator. When the user actuates the priority navigation actuator, the user is conducted through a user experience that navigates the user to different activity items (such as different email messages) based upon the importance of those messages to the user. Importance summaries can be generated for each category of interest. The importance summaries categorize the activity items that have been received in the corresponding category of interest and indicate why the activity item is important and should be viewed by the user. Content summaries can also be generated that summarize the content of each activity item (e.g., each email message). The user is conducted through a user experience which navigates the user to the different activity items (e.g., email messages) based upon the priorities assigned to those activity items, and displays the content summaries to the user for each activity item, as the user is navigated to that activity item.

This allows the user to see summaries of activity items before retrieving and opening the actual activity items. This also allows the system to surface (for user review) the most important activity items and allows the user to review a summary of the activity items before even opening the activity item (e.g., before opening the email message). This reduces the amount of network bandwidth and other computing resources consumed by the electronic message system and it also improves productivity.

FIG. 1 is a block diagram of one example of a computing system architecture 100 in which a plurality of client systems 102-104 accesses an electronic message server system 106. For purposes of the present discussion, it will be assumed that the electronic message server system 106 is an electronic mail (email) server that hosts an email system. The client computing system 102 includes one or more processors 108, data store 110, user interface system 112, and other client functionality 114. Client computing system 104 includes one or more processors 116, data store 118, user interface system 120, and other client functionality 122.

Client system 102 generates user interface 124 for interaction by user 126. User 126 interacts with user interface 124 in order to control and manipulate client system 102 and portions of electronic message server computing system 106. Client system 104, in the example shown in FIG. 1, generates a user interface 128 for interaction by user 130. User 130 interacts with user interface 128 in order to control and manipulate client system 104 and some portions of electronic message server system 106.

Electronic message server system 106 includes one or more processors or servers 132, new activity item processing system 134, summary store 136, category processing system 138, summary request processing system 140, prompt/response processor 142, application programming interface (API) interaction system 144, and other electronic message system functionality 146.

Architecture 100 illustrated in FIG. 1 also includes user-related information store 148, AI model API 150, AI model layer 152, and AI model execution layer 154. User-related information store 148 stores user-related data corresponding to one or more users 126 and 130. For instance, user data 156 can include data corresponding to user 126, such as mailbox data 158, user profile data 160, frequent contacts 162, documents 164, categories of interest 166, user-identified data 168, user behavior data 170, and other data 172. User-related data 174 may be similar data for user 130, or different data. It is assumed that data 156 and data 174 are similar so that only data 156 is described in more detail, but this is just one example. Information store 148 can include other items 176 as well.

AI model layer 152 can include a plurality of different AI models 178-180, one or more processors or servers 182, data store 184, and other functionality 186. AI model execution layer 154 includes graphics processing unit (GPU) management system 188, a plurality of GPUs 190, and other items 192. AI models 178-180 may be different types of AI models. The AI models 178-180 are executed by GPUs 190 in AI model execution layer 152. The GPUs 190 can be managed by GPU management system 188.

In overall operation, in general, users 126 and 130 can use client systems 102 and 104 to send electronic messages to one another using electronic message server system 106. For purposes of the present discussion, electronic message server system 106 may be described as an email system so the new activity items may be new email messages. When user 130 is logged out of his or her electronic mail system, and user 126 sends user 130 an email message, the email message is referred to as a new activity item as it reflects new activity in the mailbox of user 130 that has not yet been seen by user 130. Electronic message server system 106 receives that email message and not only performs conventional email processing (such as placing the new email message in the inbox of user 130) but also analyzes the new email message to assign it to a category of interest for user 130.

Category processing system 138 can generate the categories of interest for user 130 by accessing the user-related data in store 148 and identifying, based upon the user-related data, the particular categories of interest for user 130. New activity item processing system 134 can also provide the electronic mail message and the identity of the categories of interest for user 130 (along with other data described below) to AI model API 150 which invokes one or more of the AI models 178-180 to process the email message and assign it to a category of interest for user 130 as well as to assign it a priority or importance rank for user 130 within that category. New activity item processing system 134 can also invoke one or more of the AI models in AI model layer 152 to generate summaries based on the newly received email message. The summaries can include a plurality of different types of summaries, such as a digest summary that summarizes all the new activity that has taken place since user 130 last viewed his or her inbox. The summaries can also include an importance summary that identifies why a particular activity item (e.g., a particular email message or meeting request, etc.) is important to user 130. System 134 can also request one or more of the AI models in AI model layer 152 to generate a content summary for the new email message. In addition, related activities (e.g., related email messages, related meeting notes, etc.) that are related to the new email message, may also be provided to the AI model so that a summary of the importance of all those related items to user 130 can be generated, and also so that a content summary that summarizes all of those related items, can also be generated for viewing by user 130, next time user 130 accesses his or her inbox. All of the summaries, as well as the priorities assigned to each activity item (e.g., each email message or group of email messages) can be stored in summary store 136 for later retrieval and presentation to user 130.

When user 130 next logs onto his or her email system, summary request processing system 140 accesses all of the relevant summaries in summary store 136. Therefore, system 140 retrieves the digest summary that summaries all new activity items of sufficient importance to user 130, so that the digest summaries can be displayed to user 130. In one example, the digest summary can have a priority navigation actuator that is actuatable by user 130 so that when user 130 actuates the priority navigation actuator, then summary request processing system 140 retrieves all of the importance summaries for user 130. The importance summaries summarize the importance of the activities (e.g., the important emails) corresponding to each category of interest for user 130, that have been received and have not yet been seen by user 130. If the user selects one of the items in the importance summary, then summary request processing system 140 can retrieve the content summary that summarizes the content of the activity items for that particular category (e.g., the new emails that have been received and assigned to that particular category) for user review.

In one example, summary request processing system 140 provides all of the importance summaries that have been generated since user 130 last accessed his or email system to client system 104, along with a priority order or rank for each of those summaries. If the user requests client system 104 to do so (by actuating the priority navigation actuator), then user interface system 120 can navigate user 130 through the new activity items (e.g., the new email messages), in rank order, displaying the content summaries for each new email message. User interface system 120 can navigate user 130 through the new email messages, in order of importance (e.g., in order of rank or priority), showing the content summaries for each of those email messages, as the user clicks through the messages in order of importance.

FIGS. 2-8 show examples of user interfaces that can be generated for user 130, and illustrate the operation of electronic message server system 106 and client system 104 in generating user interfaces to conduct a user experience for user 130.

Figure 2:
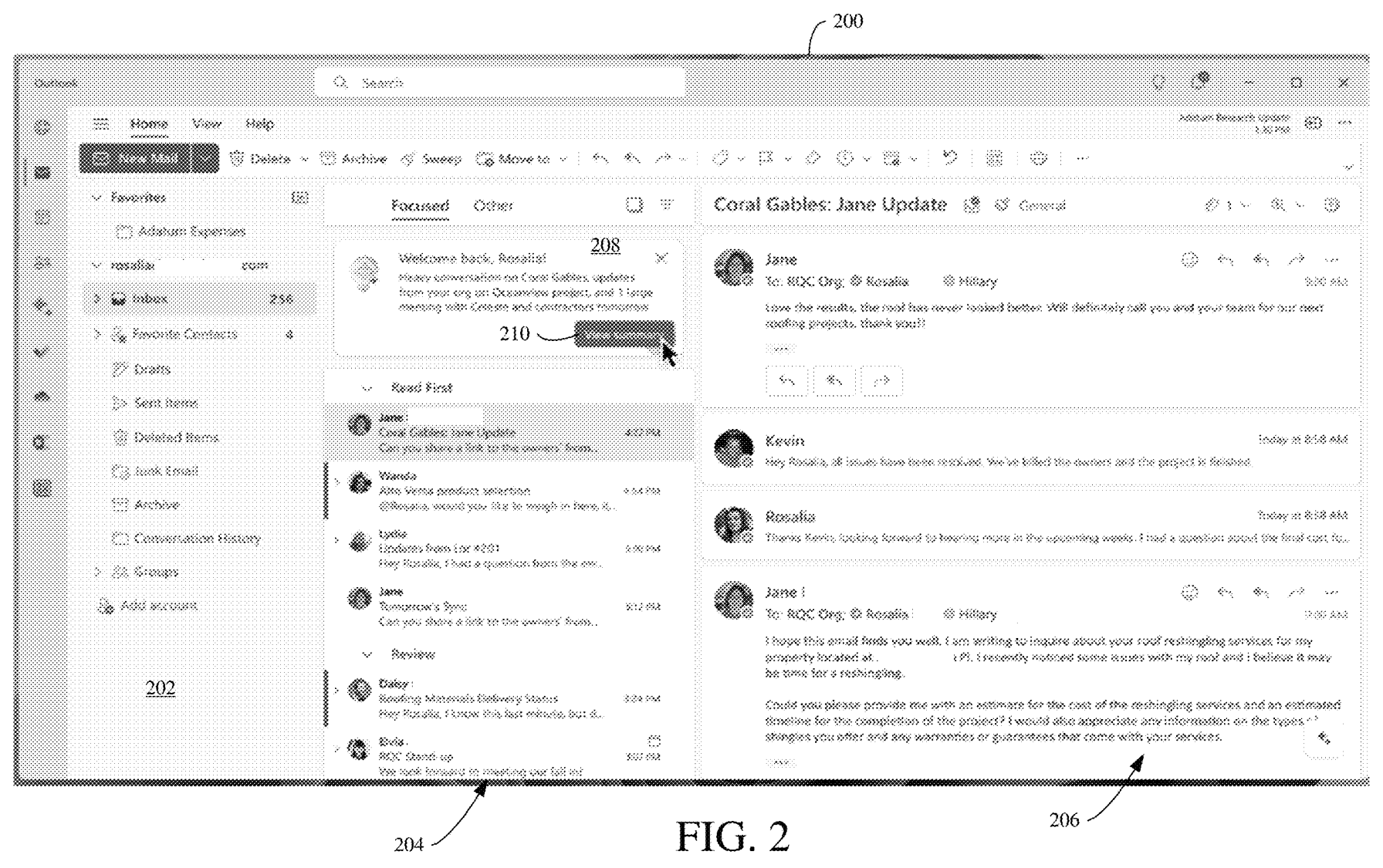

In the example shown in FIG. 2, interface 200 is an interface generated to access an electronic mail system that includes a folder pane 202 that displays various electronic mail folders, a preview pane 204 that shows previews of received messages, and a reading pane 206 that displays the content of a message (or conversation) that is selected in preview pane 204. It is first assumed that category processing system 138 has identified categories of interest for user 130 based upon the user-related data for user 130 in data store 148. The categories of interest can be identified by an AI model in AI model layer 152, using the user-related data as part of a prompt to the AI model. It is also assumed (for the description of FIGS. 2-8) that a plurality of new email messages (e.g., activity items) have been received for user 130 since the last time user 130 reviewed his or her inbox. Also, that those new email messages were processed by new activity item processing system 134 where they were assigned to a category of interest for user 130 and assigned a priority within that category. System 134 also used prompt/response processor 142 to generate a prompt and provide it to API interaction system 144. API interaction system 144 calls AI model API 150 to have a generative AI model in layer 152 generate summaries for the new email messages. The summaries can be content summaries that summarize the content of the new email messages (and related messages), importance summaries that summarize why this particular email message (or group of email messages) is important to the user, and a digest message that summarizes all of the new activity items (e.g., new email messages, meeting request, etc.) that have been received for user 130 since last time user 130 accessed his or her inbox.

Once user 130 accesses his or her inbox, summary request processing system 140 detects this (or is notified of this) and retrieves the digest summary for user 130, from summary store 136. Client system 104 can display the digest summary for interaction by user 130. The display 200 shown in FIG. 2 displays the digest summary 208 at the top of the preview pane 204. It can be seen that the digest summary briefly summarizes the new activity items (new email messages and new meeting requests, etc.) that have been received in each category of interest for user 130. Digest summary 208 also includes an actuator 210 which can be actuated by user 130 to see the importance summary. Therefore, if user 130 wishes to review the importance summary for the activities outlined on the digest summary 208, user 130 can actuate the "view summary" actuator 210. An indication of this actuation is sent from client system 104 to electronic message server system 106 where it is detected by summary request processing system 140.

Figure 3:
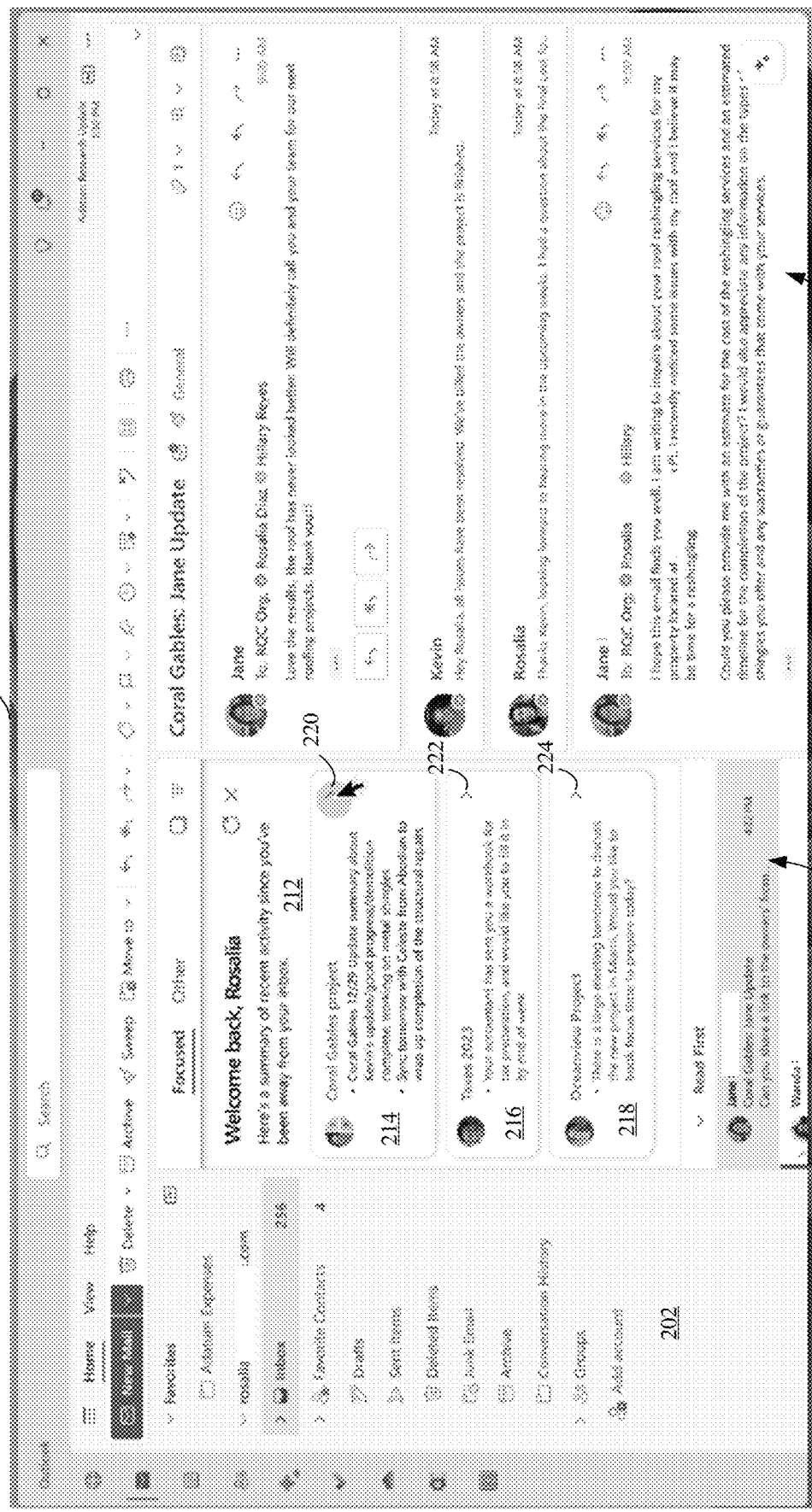

System 140 retrieves the importance summary from summary store 136 for user 130 and provides it to client system 104. Client system 104 can display the importance summary for user 130. FIG. 3 shows one example in which the importance summary 212 is displayed on user interface 202. The importance summary 212 includes a plurality of summaries 214, 216, and 218 each of which correspond to a different category of interest for user 130. The summaries 214-218 may be collapsed, and provided with expansion actuators 220, 222, and 224, respectively.

Figure 4:
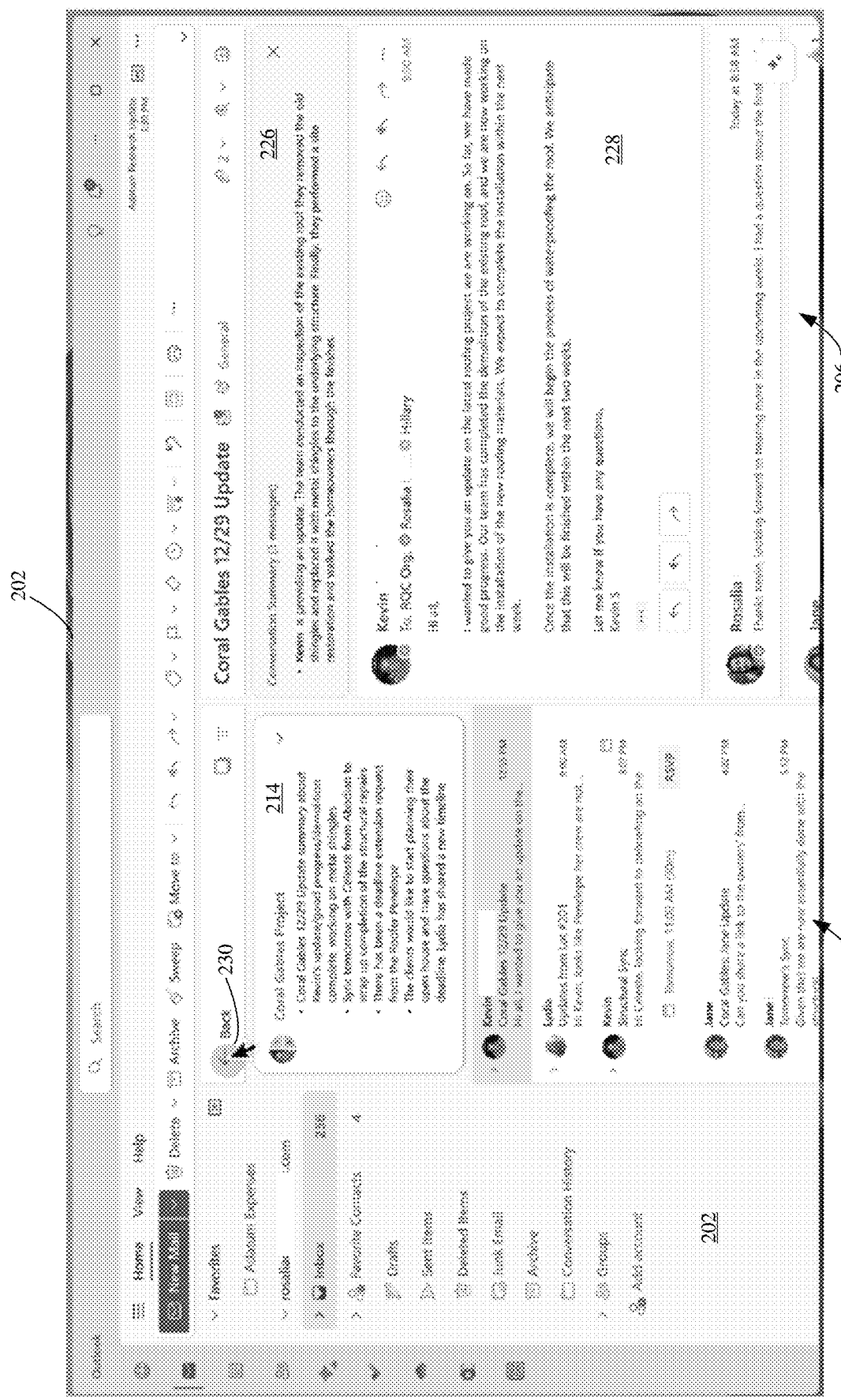

When user 130 actuates an expansion actuator (such as actuator 220 shown in FIG. 3), then the client system 140 can expand the importance summary 214 corresponding to actuator 220, as illustrated in FIG. 4. When the importance summary 214 is expanded, the other importance summaries 216 and 218 can be removed from the display 202, and the previews in preview pane 204, and the email messages shown in reading pane 206, are sorted so that the previews shown and email messages in panes 204 and 206 respectively, all relate to the category of interest corresponding to importance summary 214.

In the example shown in FIG. 4, importance summary 214 identifies four different activities that have occurred with respect to the category "Coral Gables Project". Each of the bullet points in summary 214 textually describes the relevance of the activity which occurred. The description describes why the corresponding activity item (e.g., the corresponding email message) is important to user 130.

When user 130 actuates one of the previews in preview pane 204, then the corresponding email message is displayed in pane 206 along with a content summary 226 corresponding to the email message. In one example, there are a plurality of different email messages corresponding to the selected email message 228. The corresponding email messages form a conversation of three messages, and content summary 226 summarizes the content of all three of those messages. Where only a single email message is selected, however, then the content summary 226 only summarizes the content of that selected email message.

Figure 5:
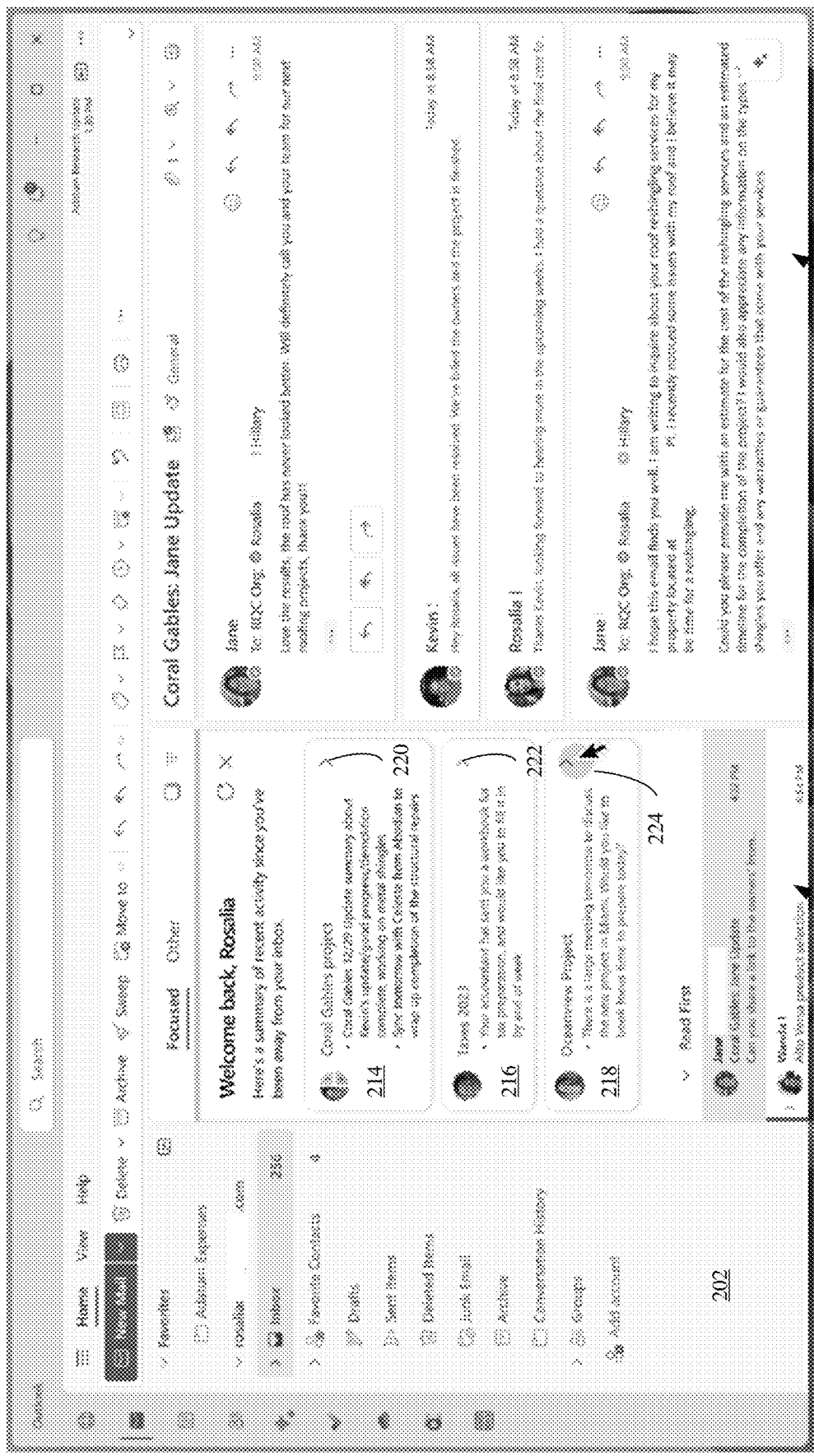

FIG. 4 also shows that the display 202 can include a back actuator 230 that can be actuated by user 130 to return to the importance summary 212 shown in FIG. 3. User 130 can then select a different expansion actuator (such as actuator 224) as illustrated in FIG. 5. Again, when the user selects expansion actuator 224 for summary 218, then the other summaries 214 and 216 are removed from the display and the preview pane 204 and the reading pane 206 are sorted to only show the messages corresponding to the importance summary 218.

Figure 6:
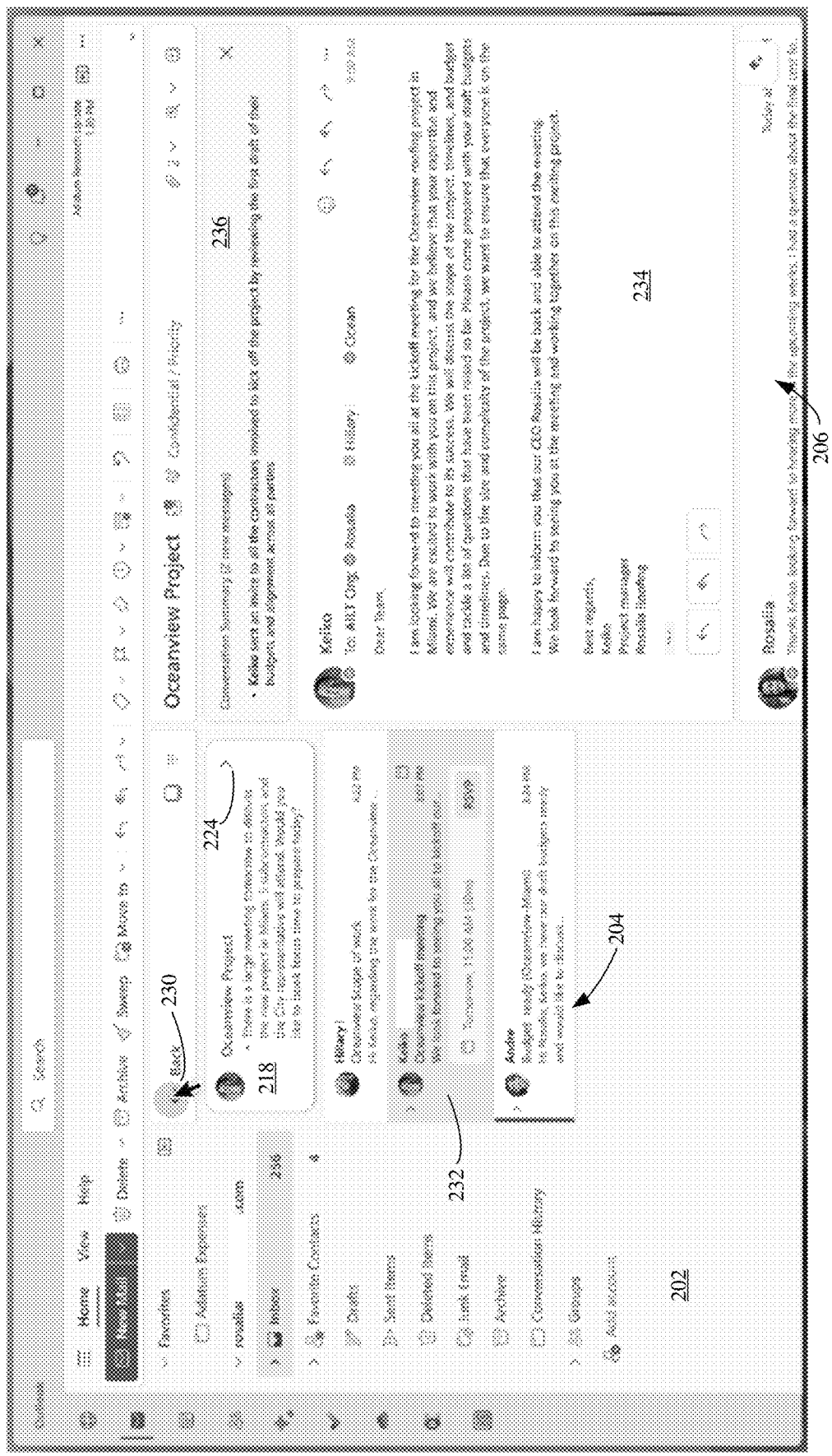
Figure 7:
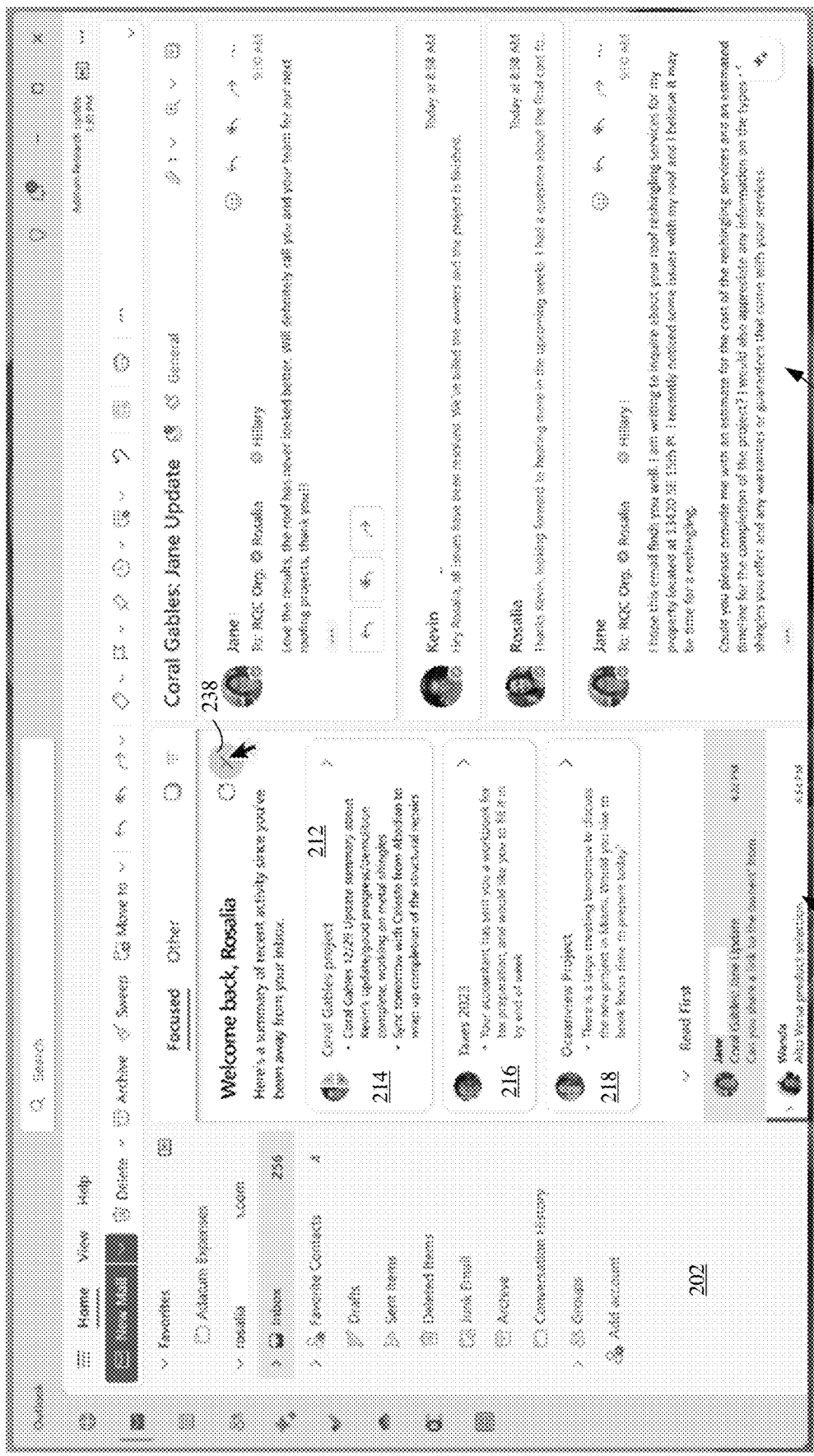
Figure 8:
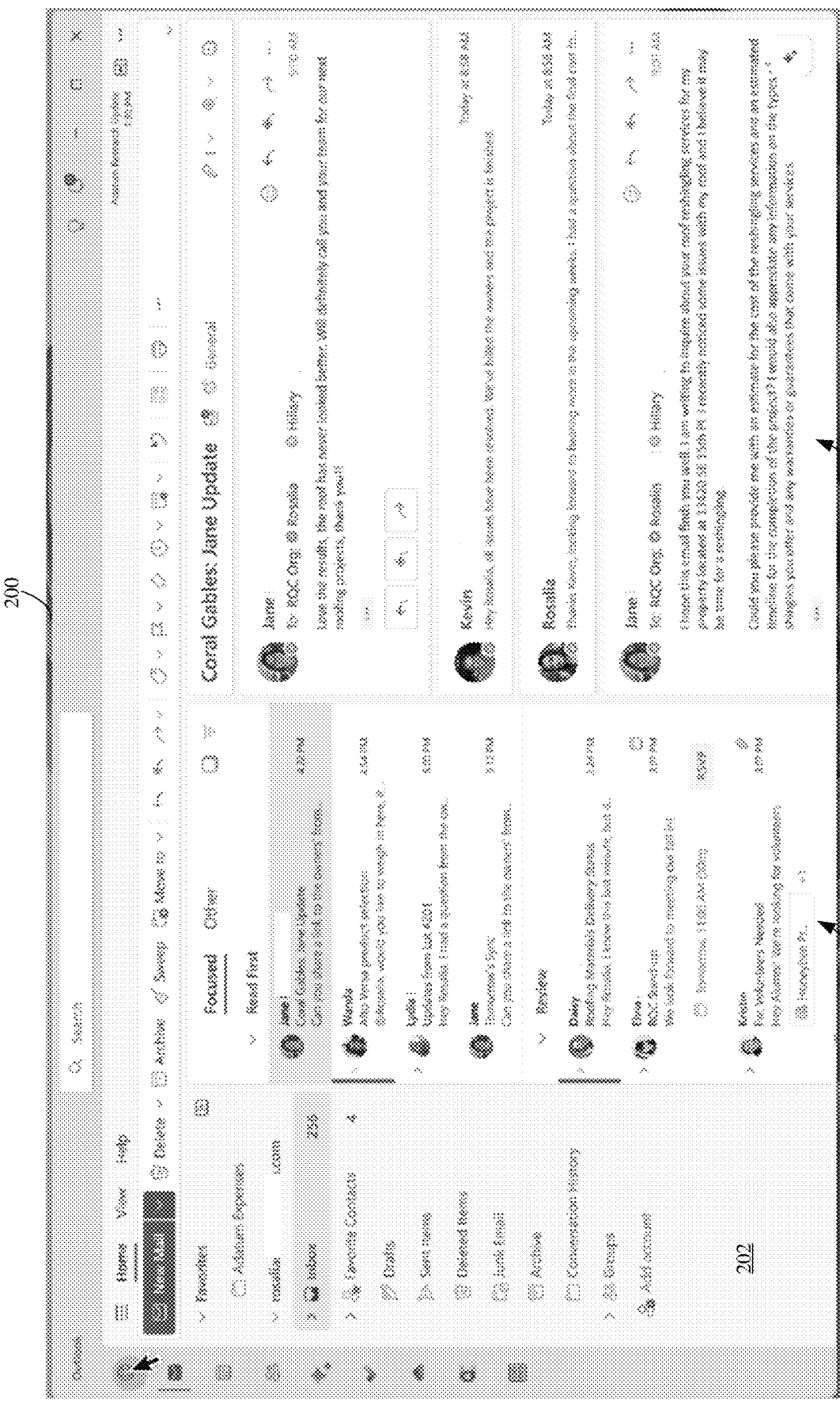

It can be seen in FIG. 6 that the user has selected a message 232 in the preview pane 204 shown in FIG. 6 and reading pane 206 thus displays the corresponding message 234 along with the content summary 236 corresponding to message 234 (and any related messages). Again, user 130 can actuate the back actuator 230 to return to the importance summary 212 and can exit out of the user experience showing the summary of recent activity by actuating a close or stop actuator 238. At that point, display 202 removes all of the summaries, as shown in FIG. 8.

Figure 9:
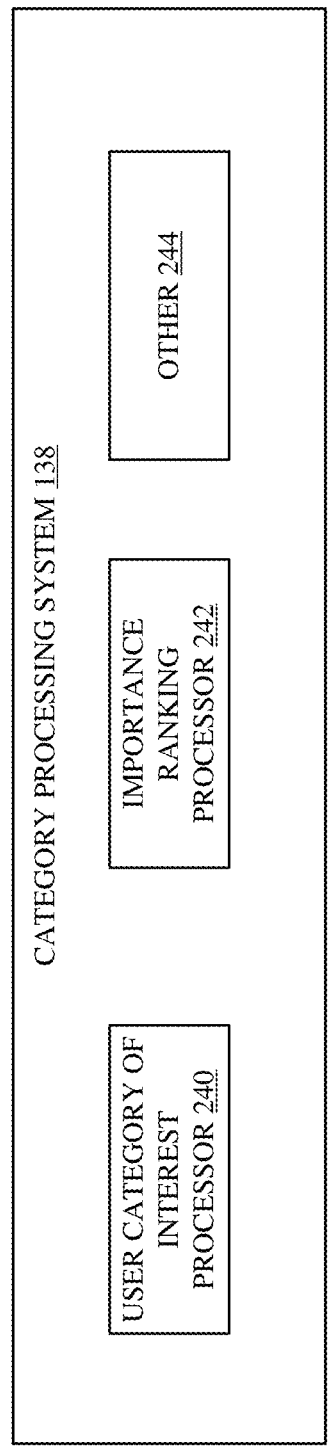
FIG. 9 is a block diagram showing one example of a category processing system in more detail.

Before proceeding with a more detailed explanation of the operation of architecture 100, illustrated in FIG. 1, a more detailed description of examples of some of the items in architecture 100, and their operation, will first be provided. FIG. 9 shows a block diagram of one example of category processing system 138, in more detail. In the example shown in FIG. 9, category processing system 138 includes user category of interest processor 240, importance ranking processor 242, and other items 244. User category of interest processor 240 can access the user-related information in store 148 for user 130 and identify the categories of interest for user 130.

Processor 240 can identify categories of interest in a variety of different ways. For instance, processor 240 can collect all of the user-related data for user 130 and provide that data as part of a prompt or set of prompts to an AI model 178 that classifies that data into a set of categories. In another example, processor 240 can access the user-related data and use an AI model, heuristics, other models, or other processing systems to generate a semantic understanding of the content of each of the items of user-related data, as well as parameters corresponding to that data (such as how often that piece of data is accessed, how often the user interacts with certain other users, how quickly the user responds to other users or certain types of requests, the different types of documents that the user has authored, reviewed, edited, etc.), to identify the categories of interest for user 130. It will be noted that the categories of interest for a user 130 may also vary based upon the context of user 130, such as whether user 130 is using a desktop device or a mobile device, whether 130 is working remotely or working in an office or at home, the time of day that user 130 is using the messaging system, or any of a wide variety of other criteria.

Importance ranking processor 242 then ranks the categories of interest for user 130 in order of their importance to user 130. It will be noted that the importance may differ, for the different categories, based upon the context of user 130, such as whether user 130 is using a desktop device or a mobile device, whether the user is working remotely or in a particular work location, etc.

Importance ranking processor 242 can identify the importance of the different categories for user 130, in different contexts, by invoking an AI model in AI model layer 152 as well. Also, in one example, a single call may be made to API 150 with the user-related information, and one or more AI models can return both the categories of interest to user 130 in the different contexts of user 130, along with the importance ranking of each category, in those different contexts.

Figure 10:
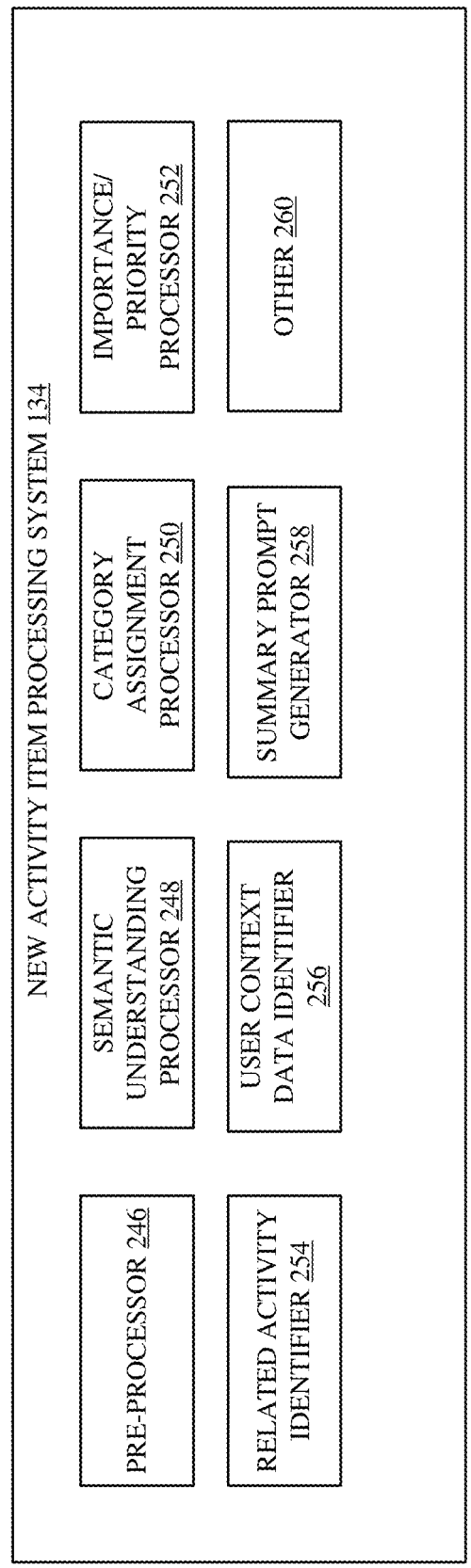
FIG. 10 is a block diagram showing one example of a new activity item processing system in more detail.

FIG. 10 is a block diagram showing one example of new activity item processing system 134 in more detail. Recall that new activity item processing system 134 receives new activity items (such as new email messages, new meeting request, etc.) that have been received and have not yet been seen by user 130. System 134 categorizes those new activity items and assigns an importance or priority to those items 130 and then has various summaries generated based on those new activity items (such as a digest summary, an importance summary, a content summary, etc.). System 134 then stores the summaries, along with the category assignments and priority rankings, stored in summary store 136 for later retrieval and presentation to user 130.

In the example shown in FIG. 10, new activity item processing system 134 includes pre-processor 246, semantic understanding processor 248, category assigning processor 250, importance/priority processor 252, related activity identifier 254, user context data identifier 256, summary prompt generator 258, and other items 260. Pre-processor 246 may be a machine learned processor or another type of processor that pre-processes the new activity item (for purposes of the present discussion it will be assumed that the new activity item is a new email message) to determine whether the new email message is unimportant. For instance, there may be certain categories or types of email messages that are not important to user 130. Those types of email messages can be identified by pre-processor 246 and removed from further processing.

Assuming that the new email message survives pre-processing, semantic understanding processor 248 then generates a semantic understanding of the new email message. Processor 248 may, for instance, be a natural language understanding system, an AI model, or another type of system that processes the new email message and generates an output indicative of the semantic meaning of the email message or the semantic content in that email message.

Category assignment processor 250 then assigns the new email message to a category of interest for user 130, based upon its semantic meaning. Again, processor 250 may call an AI model and provide the AI model with the semantic understanding or with the raw text of the email message and other metadata corresponding to the new email message, to have the category assigned. Importance/priority processor 252 identifies the importance or priority of the new email message within the assigned category. For instance, an email message requesting a meeting within the next hour on a particular project may be more important than an email message requesting backup documentation for a transaction performed with respect to that project. The importance/priority processor 252 can assign the importance or priority by invoking an AI model, or using another type of ranking system.

Related activity identifier 254 may identify related activity items, that are related to the new activity item. For instance, when the new activity item is an email message corresponding to a particular subject, or sent by a particular sender, or sent to a particular group of recipients, etc., then related activity identifier 254 may identify other email messages that are related to the new email message to generate a group of related activity identifiers (e.g., a group of related email messages, a conversation, messages in an email thread, etc.).

User context data identifier 256 identifies context data for user 230 from user-related information store 148 and other context data which may be provided by client system 104, such as the location of user 130 (e.g., work or home location), the device being used by user 130, among a wide variety of other context data. The context data may include the categories of interest for user 130, the importance criteria for user 130, or any of a wide variety of other context data.

Summary prompt generator 258 then generates a prompt that can be provided through AI model API 150 to a generative AI model in AI model layer 152 so that a summary or a set of summaries can be generated based on the new email message (or the group of related messages). For instance, summary prompt generator 258 may generate a prompt requesting the generative AI model to generate a content summary for this new email message (or group of related email messages), to generate an importance summary identifying the importance of this message or group of messages to user 130, as well as to modify a digest summary that summarizes all of the new activity that has taken place and is important to user 130, based upon the new email message. Prompt generator 258 can generate one or more prompts to have one or more AI models generate these and other types of summaries and information as well. The summaries, along with their category assignments and priorities, can then be provided to summary store 136, one example of which is illustrated in FIG. 11.

Figure 11:
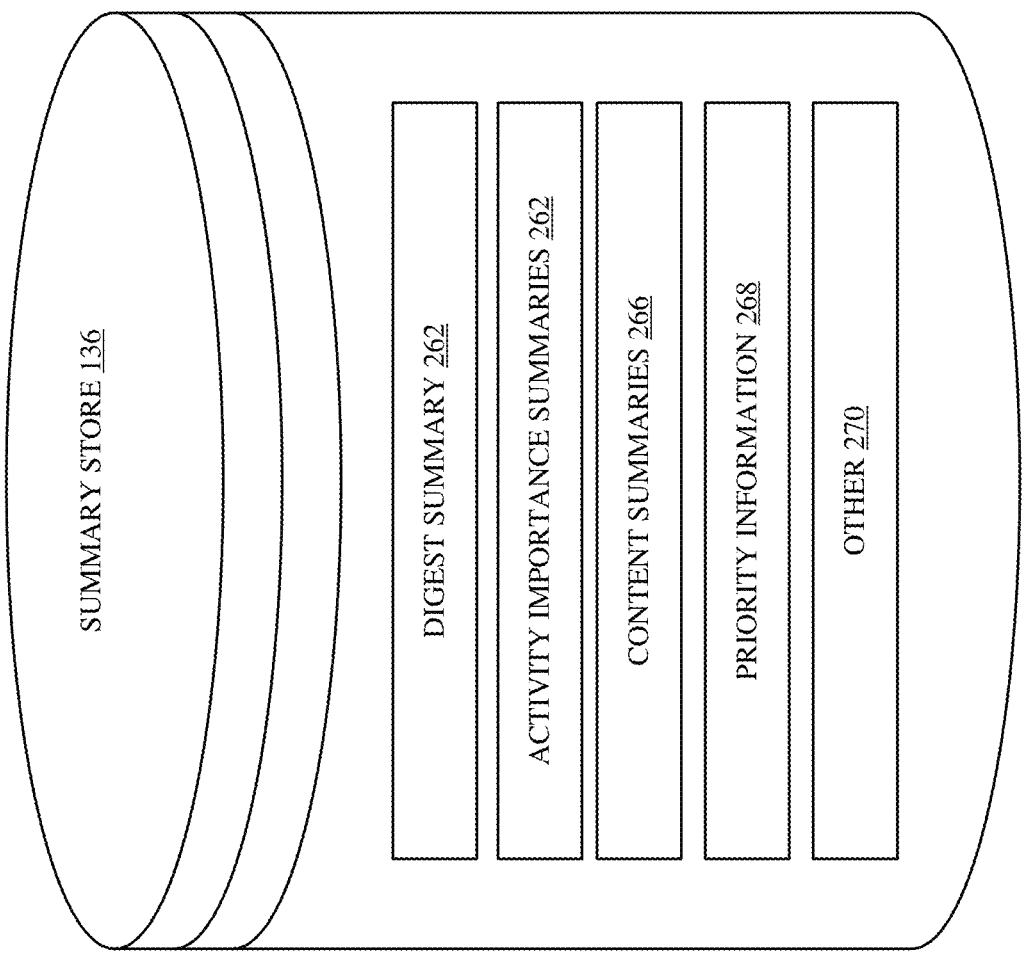
FIG. 11 shows one example of a summary store.

FIG. 11 shows that summary store 136 can include a digest summary 262 for summarizing the new activity in the inbox if user 130, a set of activity importance summaries 264 which summarize why the activity is important to user 130 (such as summaries 212 illustrated in the previous figures), content summaries 266 which summarize the content of the new email message or group of email messages (such as content summaries 226 and 236 shown above with respect to FIGS. 4 and 6, respectively).

Summary store 136 can also store the corresponding priority information 268 that corresponds to each of the summaries. For example, where a new email message is assigned to a first category of interest for user 130 and has the highest priority, then the summaries generated for that particular email message will also have high priority in that particular category. When the summaries are then later provided to client system 104, they are provided along with the corresponding priority so that client system 104 can determine which messages that user 130 should be navigated to, and in what order. Summary store 136 can store other items 270 as well.

Figure 12:
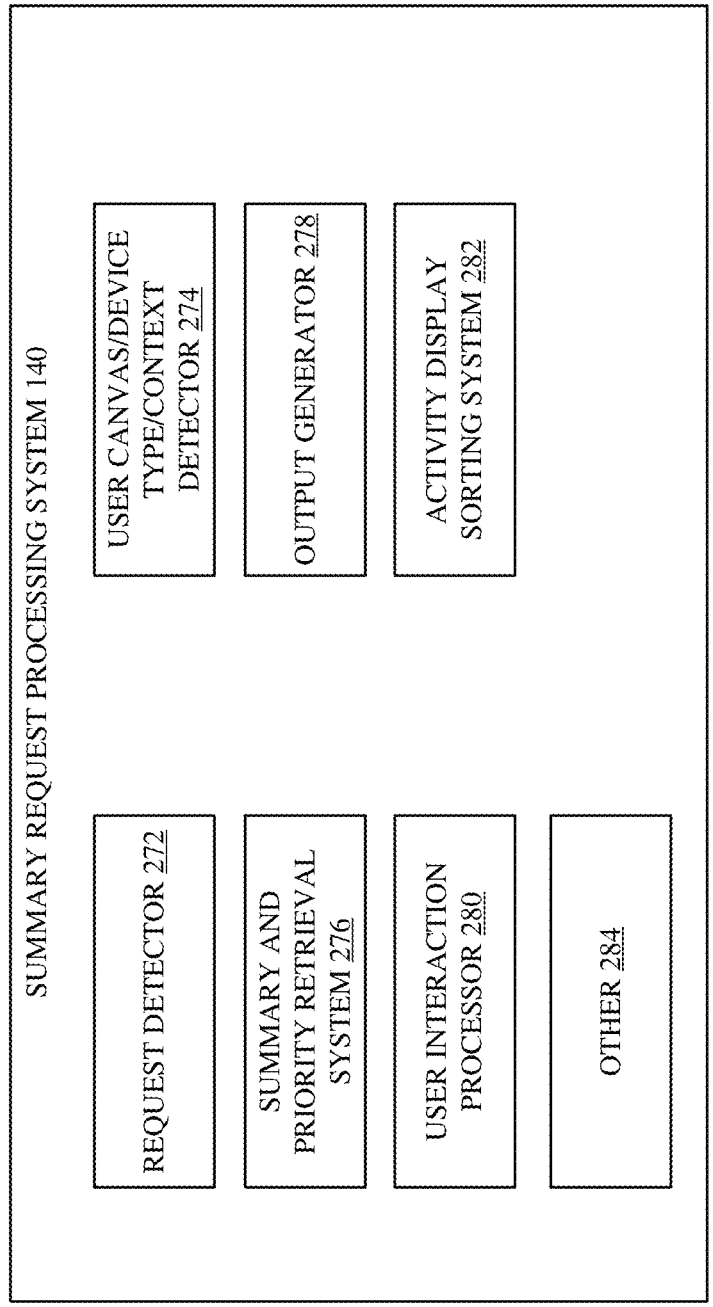
FIG. 12 is a block diagram showing one example of a summary request processing system.
Figure 13A:
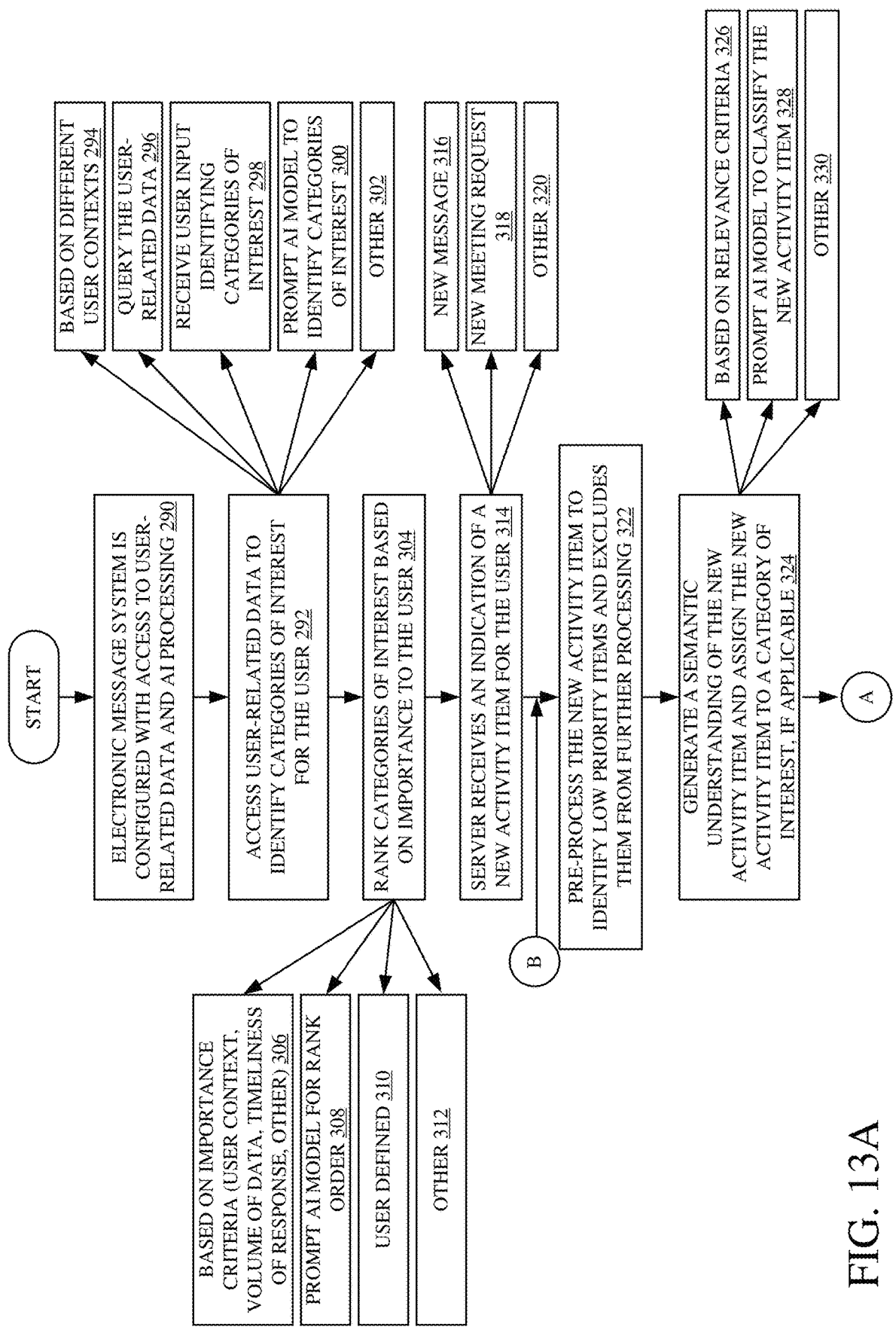
FIGS. 13A, 13B, 13C, and 13D (collectively referred to herein as FIG. 13) show one example of a flow diagram illustrating the operation of the computing system architecture illustrated in FIG. 1.
Figure 13B:
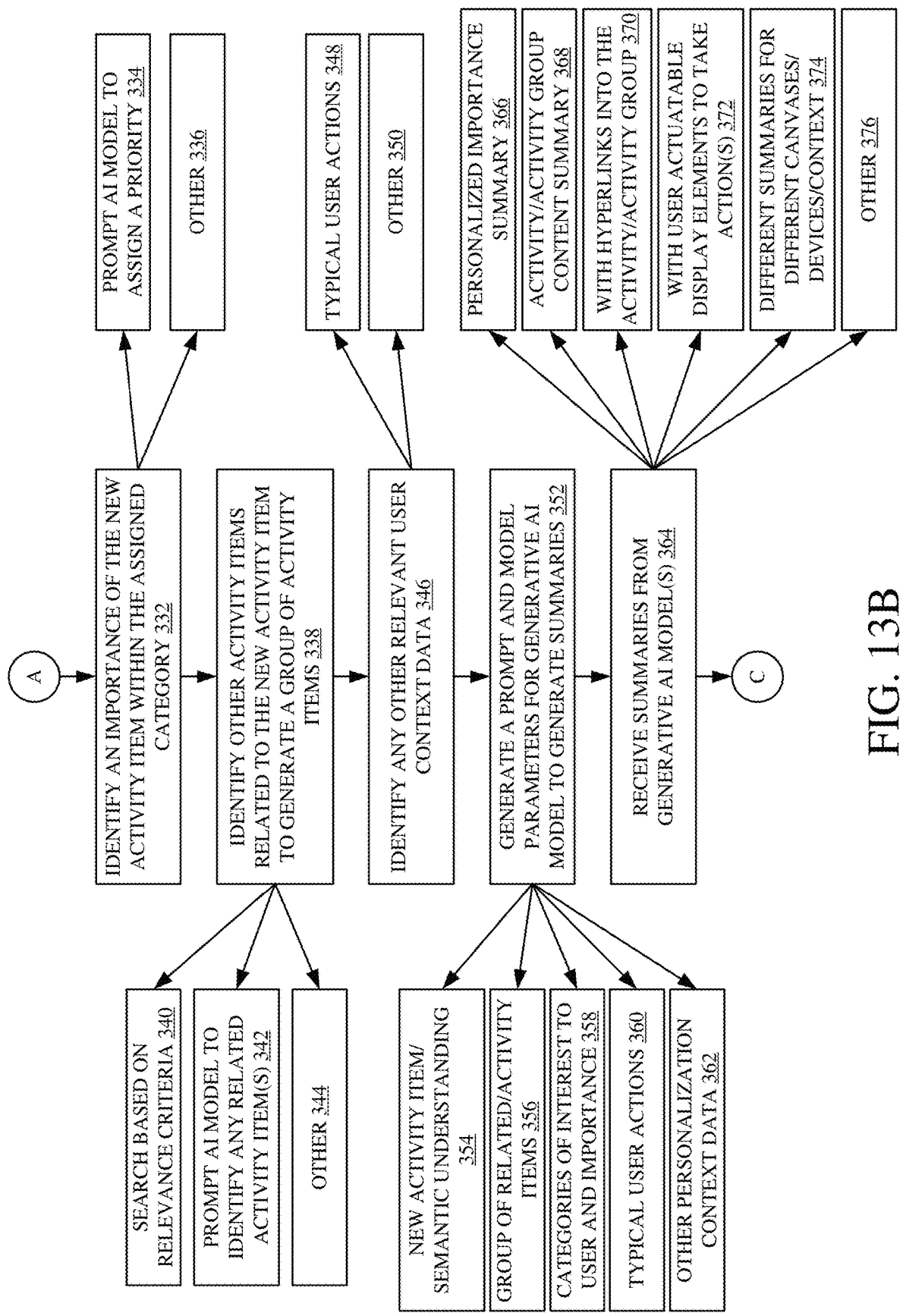
Figure 13C:
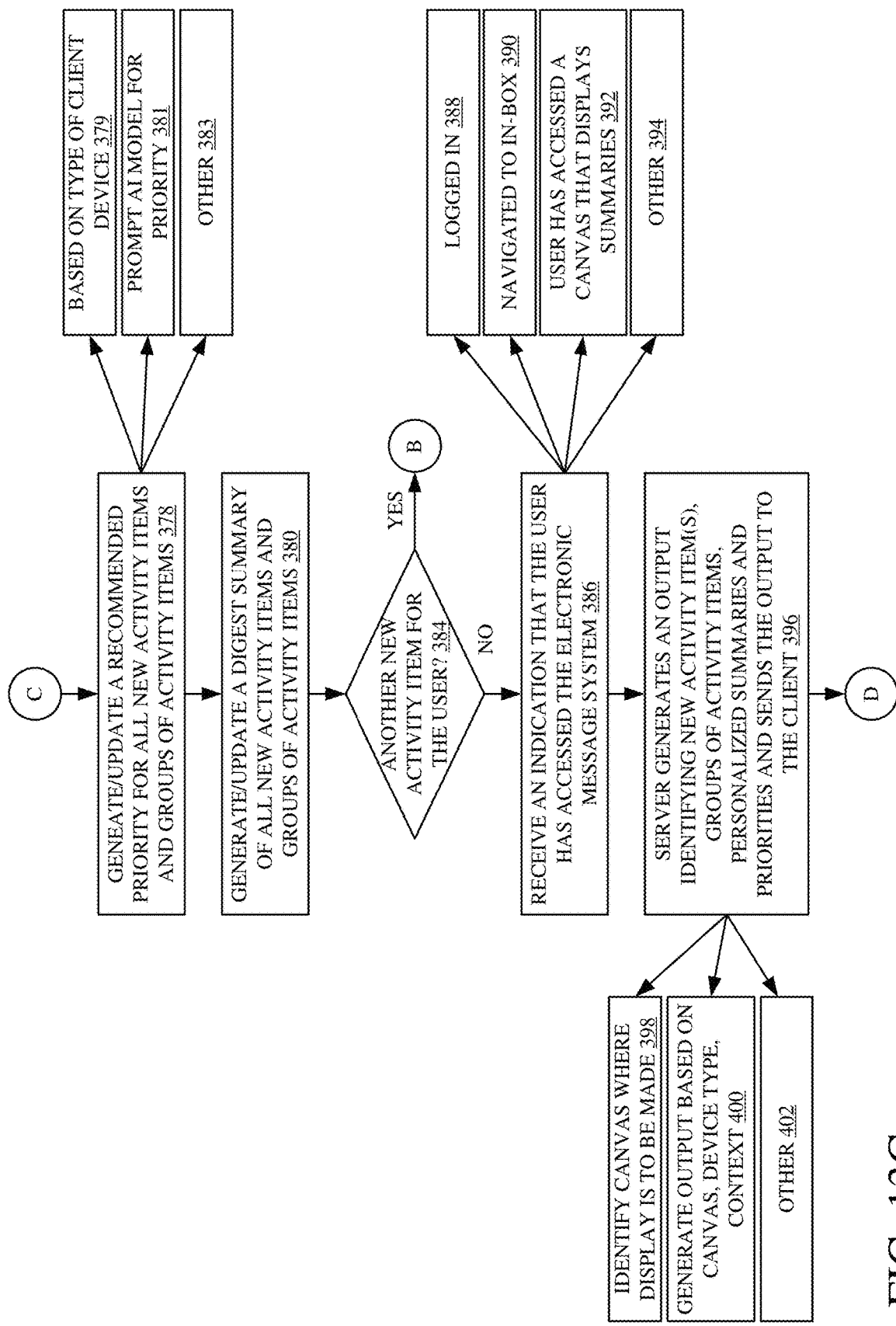
Figure 13D:
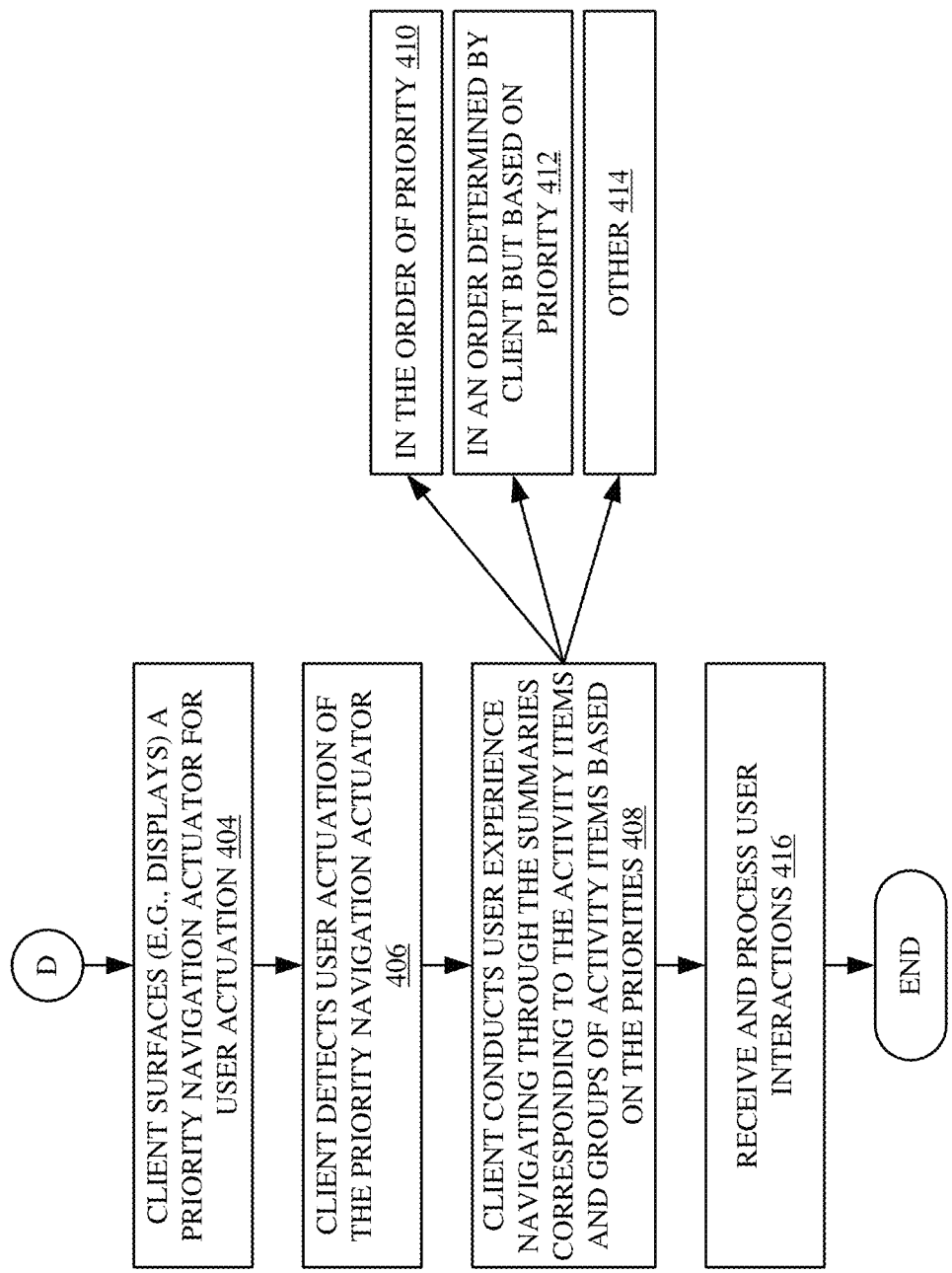

For purposes of the present description, it is assumed that all new activity items (new email messages, meeting requests, chat messages, etc.) that have occurred since user 130 last viewed his or her inbox, have been assigned categories, priorities, and that summaries have been generated based on them and stored in summary store 136. It is also assumed that user 130 logs back into his or her email system and accesses his or her inbox (or accesses any other canvas generated by client system 104, from which user 130 can see the activity items or summaries). In that case, summary request processing system 140 requests summaries from summary store 136 so that the summaries can be provided to client system 104 for display (or other presentation) to user 130. One more detailed example of summary request processing system 140 is illustrated in FIG. 12. System 140, in the example shown in FIG. 12, includes request detector 272 user canvas/device type/context detector 274, summary and priority retrieval system 276, output generator 278, user interaction processor 280, activity display sorting system 282, and other items 284. Request detector 272 determines that user 130 has interacted with the electronic message server system 106 in a way that one or more summaries should be displayed or otherwise surfaced for user 130. For instance, request detector 272 may detect that user 130 has navigated to the user's inbox. In that case, user canvas/device type/context detector 274 detects the particular canvas (or application) from which user 130 is going to be viewing the summaries. Detector 274 may also detect the device type and other context corresponding to user 130 for retrieving the summaries. The canvas, device type, and other context of user 130 is provided to summary and priority retrieval system 276.

System 276 accesses summary store 136 to access the summaries and corresponding priorities for user 130, given the canvas on which they will be displayed to user 130, the device type being used by user 130, and the other context information corresponding to user 130. The summaries (e.g., digest summary 262, activity importance summaries 264, content summaries 266, and priority information 268) can then be retrieved and returned to client system 104 for presentation to user 130. It will be noted that, while electronic message server system 106 sends a suggested priority to client system 104 for displaying summaries to user 130, client system 104 may display the summaries to user 130 in a different order, or in an order based on the suggested order, or in another way.

It may also be that user 130 interacts with user actuatable display elements on the summaries or other information displayed to user 130 and those actuations can be sent back to user interaction processor 280 so that they can be processed. For instance, when the user actuates the actuator 210 on digest summary 208 in FIG. 2, this is processed by processor 280 to retrieve the activity importance summaries 264 so that they can be displayed to user 130. Activity display sorting system 282 can also sort the messages displayed based upon the user interactions. For example, the messages displayed in preview pane 204 and reading pane 206 can be sorted based on user selection of a particular summary, a particular email message, etc.

In another example, the activity importance summaries 264 and content summaries 266 and priority information 268 can be sent along with the digest summary 262 so that client system 104 can navigate user 130 through those various summaries without having to make another call to the electronic message server system 106. These are just examples and other communication processes can be used as well.

FIGS. 13A, 13B, 13C, and 13D (collectively referred to herein as FIG. 13) show a flow diagram illustrating one example of the operation of architecture 100 (illustrated in FIG. 1 and described in further detail with respect to other figures) in generating summaries based on new activity items, storing those summaries, assigning the new activity items to categories of interest and priority rankings, and then retrieving the summaries and displaying them to user 130 or allowing client system 106 to navigate user 130 through those summaries based on the priorities and categories assigned to the summaries. Again, for purposes of the present discussion it will be assumed for the bulk of the following discussion that the activity items are email messages, although this is just one example and other activity items can be processed as well. It is first assumed that electronic message system 106 is configured with access to user-related data in data store 148 and artificial intelligence processing (such as AI models in AI model layer 152), as indicated by block 290 in the flow diagram of FIG. 13. Category processing system 138 then accesses the user-related data to identify categories of interest for the user 130, as indicated by block 292. The categories of interest may be identified based upon different user contexts 294, and/or by querying the user-related data in data store 148, as indicated by block 296. The categories of interest may be defined by the user, based upon a user input, as indicated by block 298, and/or the categories of interest can be identified by using processor 240 to prompt an AI model to generate the categories of interest based upon the user-related information, as indicated by block 300. The categories of interest can be identified in other ways as well, as indicated by block 302.

Importance ranking processor 242 then ranks the categories of interest based upon their importance to the user, as indicated by block 304. The importance of the categories of interest can be identified based upon any of a wide variety of different types of importance criteria, such as user context, the volume of data corresponding to a particular category for this user, the recency with which user 130 interacts with the data, the timeliness of response to another user, or any of a wide variety of other criteria. It will be noted that the categories of interest can include topic categories, persons, places, or any of a wide variety of other categories of interest. Outputting the categories of interest based upon predefined or dynamic importance criteria is indicated by block 306 in the flow diagram of FIG. 13. The importance of each category may change over time and can also be generated by invoking an AI model to provide a rank order for the different categories of interest, as indicated by block 308. The categories of interest may also be ranked in order of importance to user 130 based upon a user input, as indicated by block 310 or in other ways as indicated by block 312.

At some point, new activity item processing system 134 receives an indication that a new activity item has been received for user 130, such as a new email message. Receiving such an indication is indicated by block 314 in the flow diagram of FIG. 13. Again, the new activity item may correspond to a new message 316, a new meeting request 318, or another new activity item 320. It is assumed to be a new email message. Pre-processor 246 can pre-process the new email message to identify whether it is a low priority item and thus exclude it from further processing as indicated by block 322. The pre-processing can be done at any point in the processing, and it is described at this location in FIG. 13 for the sake of example only.

Semantic understanding processor 248 then generates a semantic understanding of the new email message and assigns the new email message a category of interest, if applicable. It may be, for instance, that the new email message corresponds to one of the identified categories of interest or not. Generating a semantic understanding of the email message and assigning it to a category of interest is indicated by block 324 in the flow diagram of FIG. 13. The new email message can be assigned to the category of interest by category assignment processor 250 based upon relevance criteria, as indicated by block 326 and/or by prompting an AI model to classify the new email message into one of the categories of interest, as indicated by block 328. The semantic understanding can be generated and the email message can be assigned to a category using AI models or using other mechanisms, as indicated by block 330.

Importance/priority processor 252 then identifies an importance of the new email message within the assigned category (and possibly an overall importance relative to all other new activity items) as indicated by block 332 in the flow diagram of FIG. 13. Again, the importance or priority of the new email message, overall and/or within the assigned category can be generated by prompting an AI model to assign a priority, as indicated by block 334, or in other ways as indicated by block 336.

Related activity identifier 254 identifies other email messages, meeting requests, etc., that are related to the new email message (if any) to generate a group of related activity items, as indicated by block 338. For instance, related activity identifier 254 can search the user-related information (e.g., the user's mailbox data, etc.) for other related activity items based on relevance criteria, as indicated by block 340, or prompt an AI model to identify any related activity items as indicated by block 342, or identify any related activity items in other ways, as indicated by block 344.

User context data identifier 256 can identify any other relevant user context data which may be useful in generating a summary. Identifying the other user context data is indicated by block 346 in the flow diagram of FIG. 13. Such context data may include user behavior information, such as how a user normally acts in response to an email message similar to the newly received email message. By way of example, if the new email message is related to a certain project, then the user 130 may normally send that email to all of his or her direct reports. Identifying typical user actions as additional user context data is indicated by block 348 and a wide variety of other additional user context data can be identified as well, as indicated by block 350. This type of user context data may be retrieved and provided to summary prompt generator 258 along with the newly received email message, the semantic understanding, the category assignment, the importance or priority assignment, and any related activity items. Summary prompt generator 258 then generates a prompt and model parameters which can be provided through AI model API 150 to an AI model in AI model layer 152 for generation of summaries. Generating a prompt and model parameters for a generative AI model to generate summaries is indicated by block 352 in the flow diagram of FIG. 13.

As mentioned, the information that can be provided as part of the prompt or model parameters can include the new activity item (e.g., the new email message) and/or semantic understanding 354, the group of related activity items (e.g., related email messages) 356, the categories of interest to the user and importance of those categories and importance of the new activity item, as indicated by block 358 as well as the category that the new email message is assigned to and its importance, typical user behavior or user actions as indicated by block 360, and any of a wide variety of other personalization context data for user 130, as indicated by block 362.

Summary prompt generator 258 then uses API interaction system 144 to call AI model API model 150 with the prompt so that the prompt can be provided to an AI model in AI model layer 152 which, itself, may be run in AI model execution layer 154. The summaries and other information generated by the AI models is then returned through AI model API 150 to prompt/response processor 142 in electronic message server system 106. Receiving the summaries and outputs of the generative AI models and other AI models is indicated by block 364 in the flow diagram of FIG. 13.

As discussed above, the summaries can include personalized importance summaries 366, content summaries 368 for activity items or group of related activity items as indicated by block 368. The summaries may have hyperlinks into the activity items or groups of related activity items. For instance, where a summary includes a description describing an email message, that portion of the summary may include a hyperlink that can be actuated by user 130 to navigate directly to the corresponding email message or the corresponding portion of the email message. Generating the summaries with hyperlinks is indicated by block 370. The summaries may include user actuatable display elements to take action, such as to navigate to email messages, to take other actions based on prior user behavior, or to take still other actions, as indicated by block 372. The summaries generated may be different for different canvases/devices/context of user 130, as indicated by block 374 in the flow diagram of FIG. 13. The summaries can be generated in a wide variety of other ways, as indicated by block 376.

The AI models can also generate or update a recommended priority for all new activity items and groups of related activity items (e.g., for all new email messages and groups of related email messages) as indicated by block 378 in the flow diagram of FIG. 13. The recommended priority may differ based upon the type of device that user 130 is using, as indicated by block 379. The priority for each summary may be generated by prompting an AI model to output the priority, as indicated by block 381, or in other ways, as indicated by block 383.

Similarly, the AI models can generate or update a digest summary of all the new activity items and groups of related activity items (e.g., of all the new email messages and groups of related email messages). Generating or updating the digest summary based on the newly received email messages is indicated by block 380 in the flow diagram of FIG. 13.

As other new activity items are received (e.g., as other new email messages, meeting requests, etc., are received) while user 130 is still logged out or not accessing his or her inbox, as indicated by block 384, processing reverts to block 324 where the semantic understanding of those new email messages or other activity items is generated and they are assigned to a category of interest, etc.

However, at some point, user 130 will again access his or her inbox and an indication of this will be provided from client system 104 to electronic message server system 106 and will be detected by request detector 272, as indicated by block 386 in the flow diagram of FIG. 13. For example, the user may log into his or her email account, as indicated by block 388, navigate to his or her inbox, as indicated by block 390. In another example, user 130 may have accessed a canvas or application (other than the email application) that displays the summaries, as indicated by block 392. The indication that the user has accessed his or her email system can be received in other ways as well, as indicated by block 394.

Summary request processing system 140 can then receive or access an identifier identifying the canvas or application that user 130 is using, the type of the device user 130 is using, and other context information corresponding to user 130. This is detected by detector 274 and provided to summary and priority retrieval system 276. Summary and priority retrieval system 276 retrieves the summaries, along with their priority information, from summary store 136 and generates an output indicative of the new email message, the group of related email messages, and the personalized summaries and priorities, and sends that information to client system 104 so that it can be surfaced to user 130. Generating the output is indicated by block 396 in the flow diagram of FIG. 13. Identifying the canvas or application where the display of the summaries is to be made is indicated by block 398. Generating the output based on the canvas or application and the device type and other context information being used by the user 130 and/or client 104 is indicated by block 400 in the flow diagram of FIG. 13. This may mean that the particular summaries retrieved are based upon the canvas or application requesting the summaries, as well as the device being used by user 130 and other context information. Those summaries then output for display to the user based on their priority. This can be done in a wide variety of other ways as well, as indicated by block 402.

The client system 104 then surfaces (e.g., displays) a priority navigation actuator for user actuation, as indicated by block 404. For instance, the priority navigation actuator can be the actuator 210 on digest summary 208 shown in FIG. 2. Client system 104 detects user actuation of the priority navigation actuator, as indicated by block 406, and the user interface system 120 on client system 104 then conducts a user experience, navigating user 130 through the various summaries corresponding to the activity items or groups of related activity items (e.g., the emails and conversations or groups of related emails) based upon the priorities provided by the electronic mail message server system 106, as indicated by block 408 in the flow diagram of FIG. 13. The user 130 can be navigated through the summaries and emails and other activity items in the order of priority provided by server system 106, as indicated by block 410, or in a different order determined by client system 104, but being based on the order of priority output by the server system 106 (e.g., higher priority items may be displayed first, in general but not always, etc.), as indicated by block 412. The user interface system 120 can navigate user 130 through a user experience to view the summaries and activity items in other ways as well, as indicated by block 414.

Any user interactions with the summaries the email messages, the groups of related email messages, or other activity items can be detected and addressed by client system 104 or returned to server system 106 where user interaction processor 280 can process those user interactions to retrieve different or additional summaries, or activity display sorting system 282 can sort the email messages or other activity messages displayed (e.g., on the preview pane 204 or display pane 206 in the displays described above) or in other ways. Receiving and processing user interactions is indicated by block 416 in the flow diagram of FIG. 13.

Figure 14:
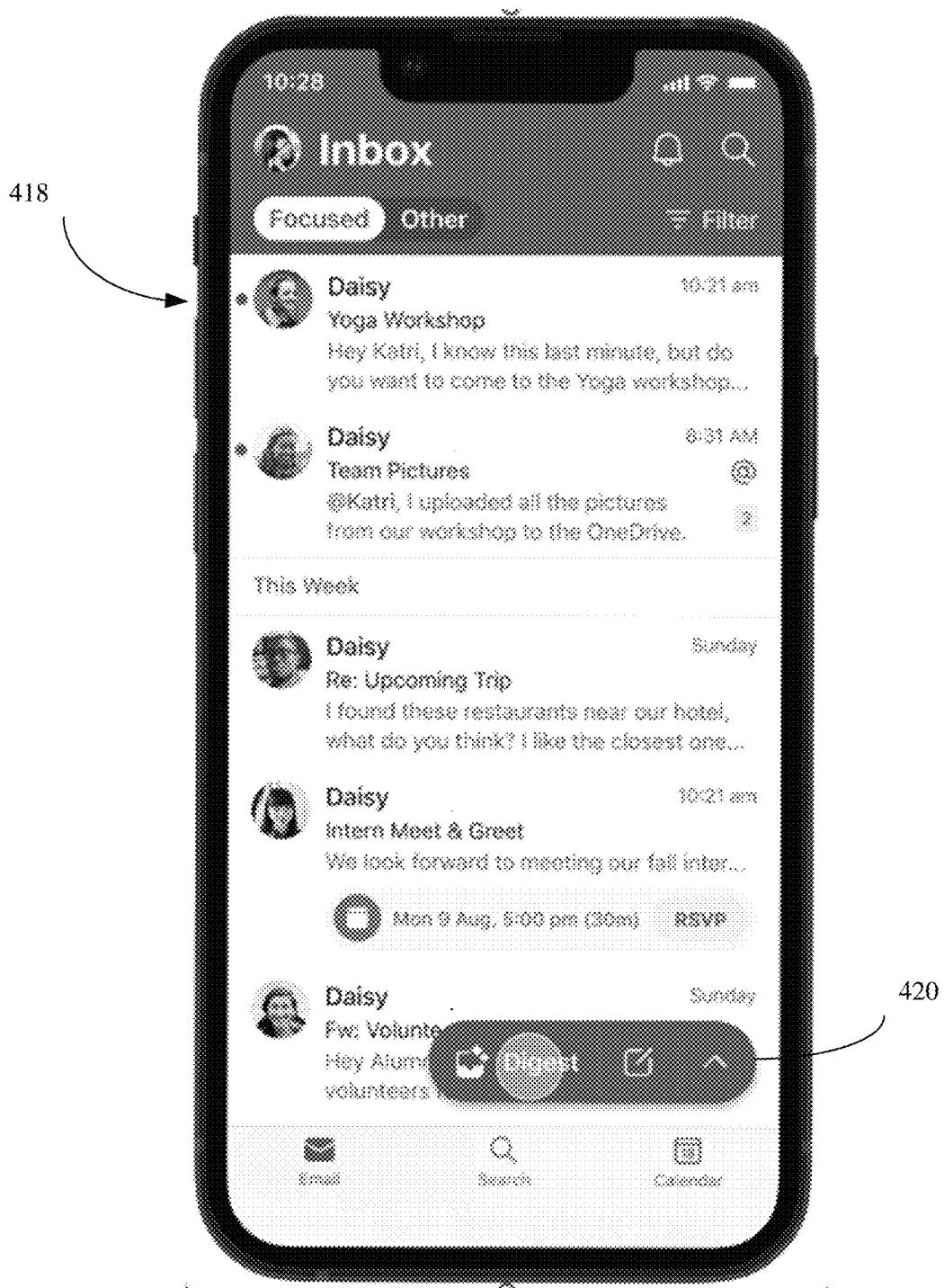
FIGS. 14, 15, 16, 17, 18, 19, and 20 show examples of user interfaces that can be generated to conduct a user experience on a mobile device.

FIGS. 14-19 show examples of user interfaces that can be generated on a mobile device and used to navigate user 130 through a set of summaries that correspond to different email messages (or other activity items) in a priority order. FIG. 14, for instance, illustrates mobile device 418 that is showing the mailbox of a user (e.g., user 130) with preview messages for new mail messages (messages received since last time the user viewed the inbox). FIG. 14 shows that the display includes a digest summary actuator 420 indicating that the user has new, important emails.

When user 130 actuates the digest summary actuator 420 shown in FIG. 14, then client system 106 displays the digest summary. Client system 104 can obtain the digest summary by interacting with summary and priority retrieval system 276 on electronic message server system 106 or, if the summary digest has already been sent to client system 104, then user interface system 120 on client system 104 can display the digest summary.

Figure 15:
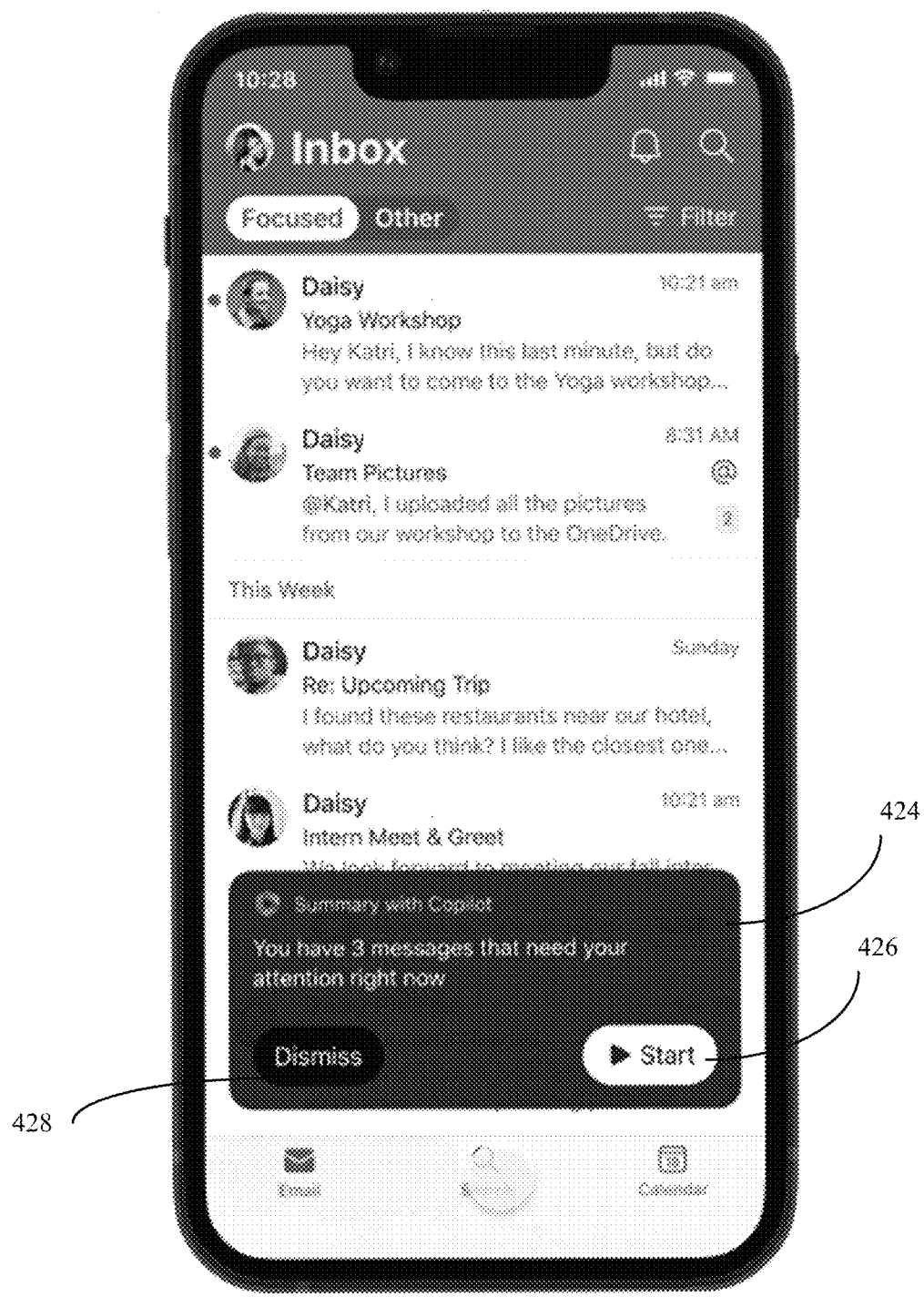
Figure 16:

FIG. 15 shows one example of a digest summary 424 which describes the new activity items (e.g., new messages) that have been received, and that are important to user 130, since the last time user 130 accessed his or her inbox. Digest summary 424 has a priority navigation start actuator 426 and a dismiss actuator 428. The user can dismiss the user experience of being navigated to the important new messages and summaries by actuating the dismiss actuator 428. If user 130 wishes to be conducted through the user experience by which user 130 is navigated to the important new messages and summaries, in order of importance, then user 130 can actuate the priority navigation start actuator 426. FIG. 16 shows one example of a display that can be generated when the user actuates actuator 426.

In the example shown in FIG. 16, the user 130 is navigated to a first email represented by preview display element 430, and user interface system 120 displays the content summary 432 generated from the email 430. The content summary 432 is shown with a connector 434 that connects the content summary 432 to the email from which the content summary was generated. The preview display element 430 may also be highlighted, shown in bold, or include other visual indicia to indicate that content summary 432 was generated from the email corresponding to display element 430. Content summary 432 can also include a message sequence indicator 437. Message sequence indicator 437 shows that user 130 is viewing the summary generated from the first of three new important, messages that have been received. The content summary 432 also includes a dismiss actuator 435 that can be actuated by user 130 to exit out of the user experience through which the user is being conducted.

Figure 17:
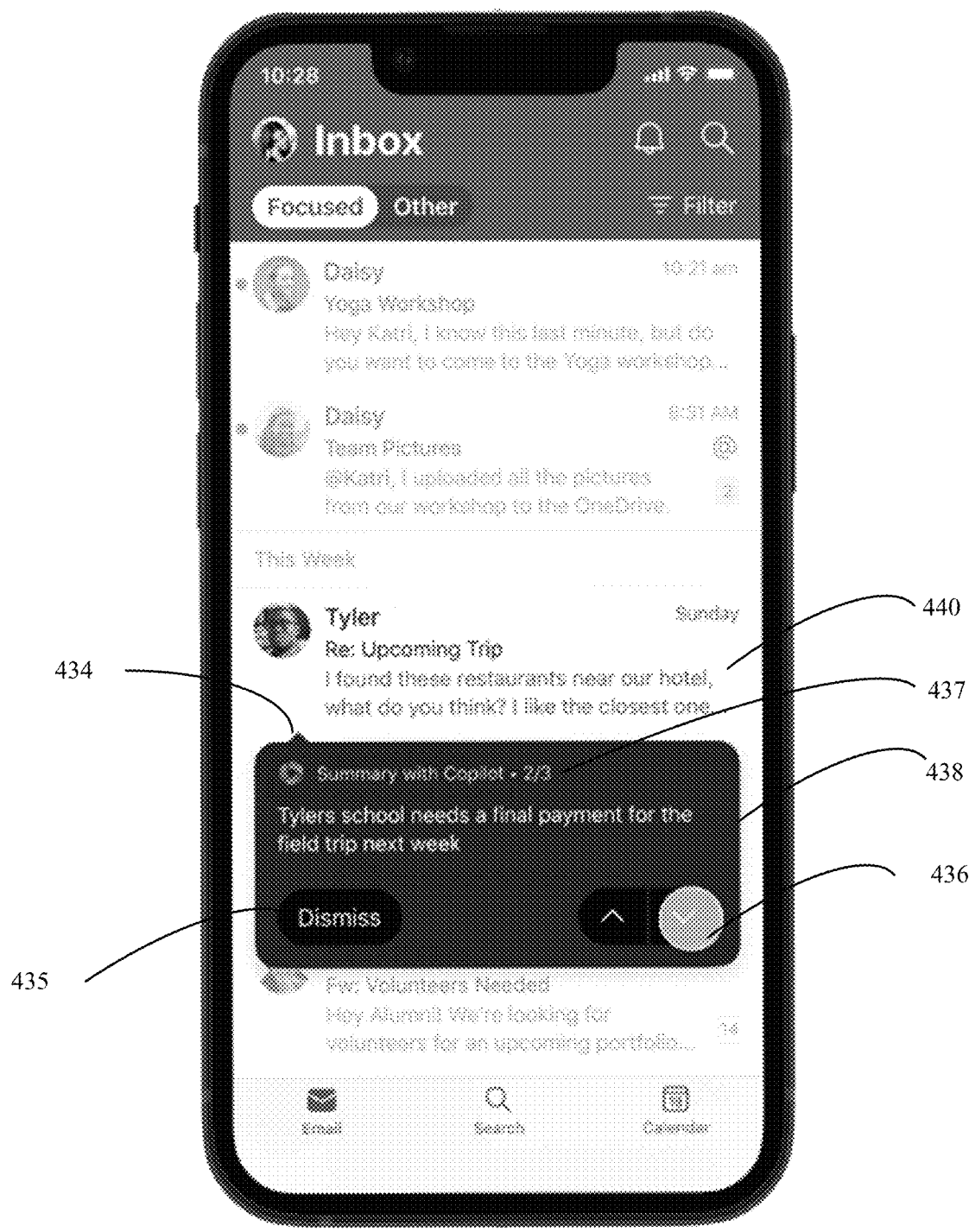

Content summary 432 also includes a "next/back" actuator 436 that can be actuated by user 130 to navigate to the summary for the next most important email or to a previously-displayed summary (if there was one). FIG. 16 shows that user 130 is actuating the "next" portion of actuator 436. In that case, then user interface system 120 navigates the user to the next most important new email messages and shows a content summary for that email message. FIG. 17 shows an example in which a content summary 438 is generated for the email message represented by summary display element 440.

FIG. 17 shows that the connector 434 now points to the display element 440, and that the message sequence indicator 437 has been incremented to show that user 130 is viewing the second summary, of three, that will be displayed in rank order. FIG. 17 also shows that the user is actuating the next actuator 436, to see the summary for the next most important new email message.

Figure 18:
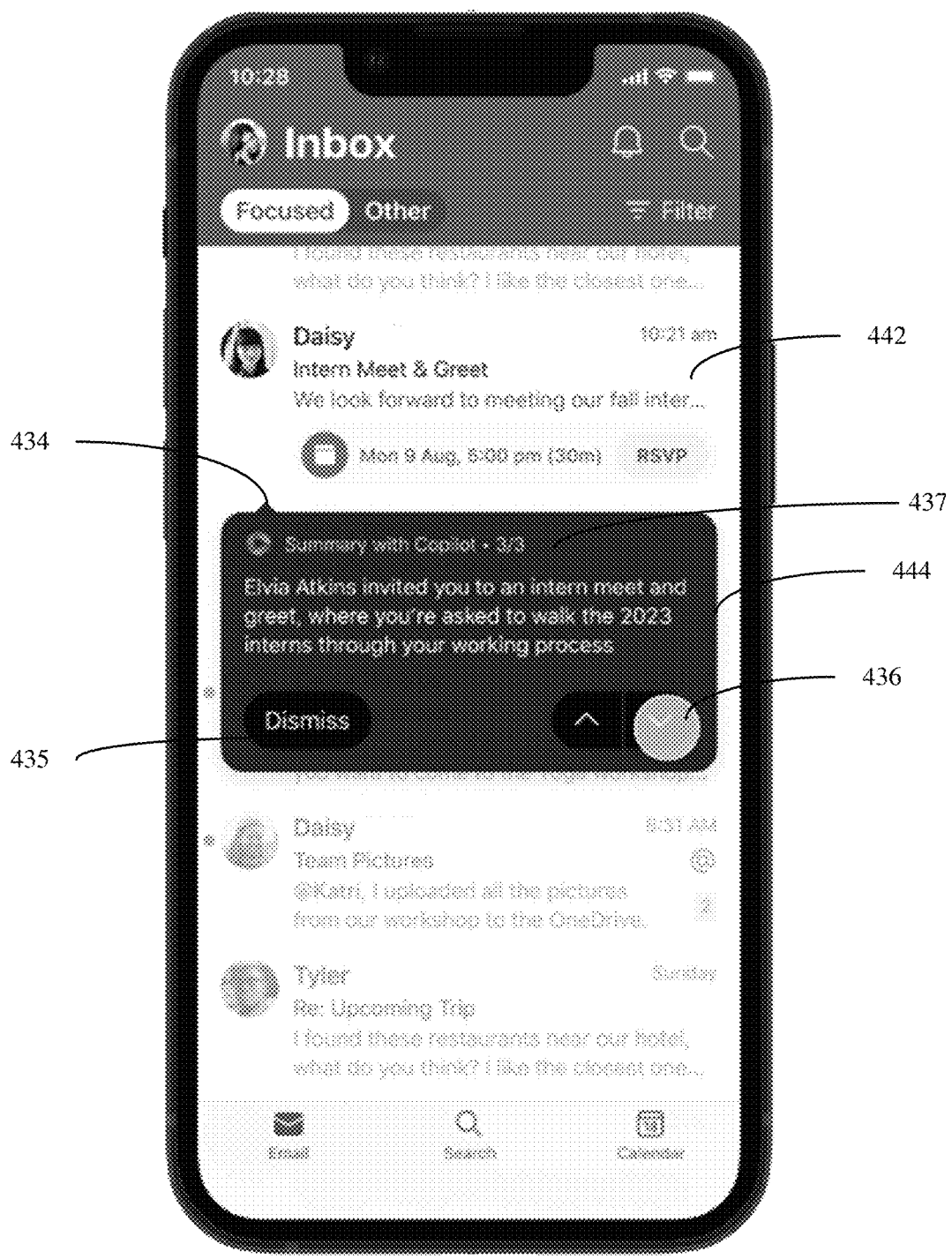
Figure 19:
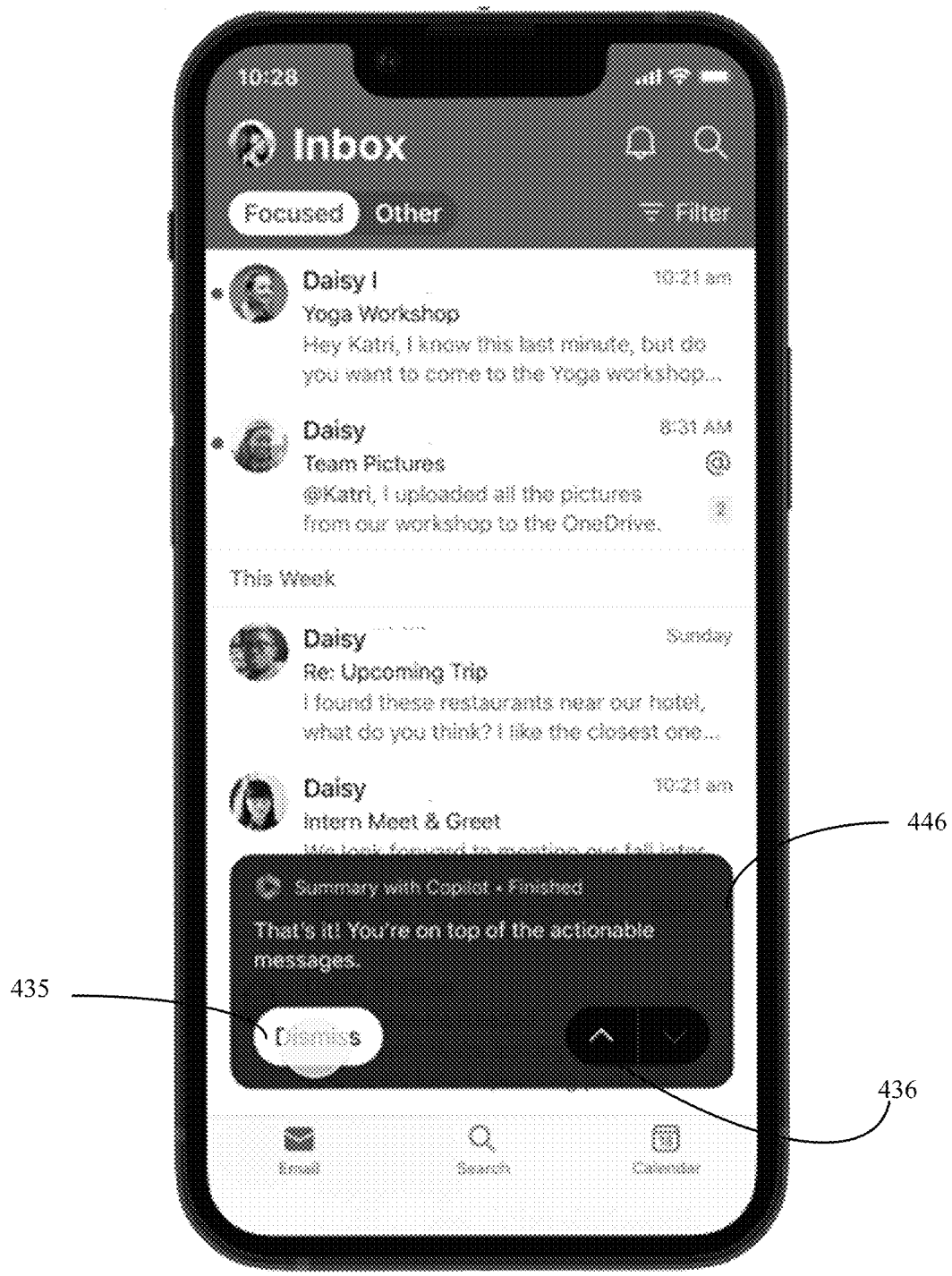
Figure 20:
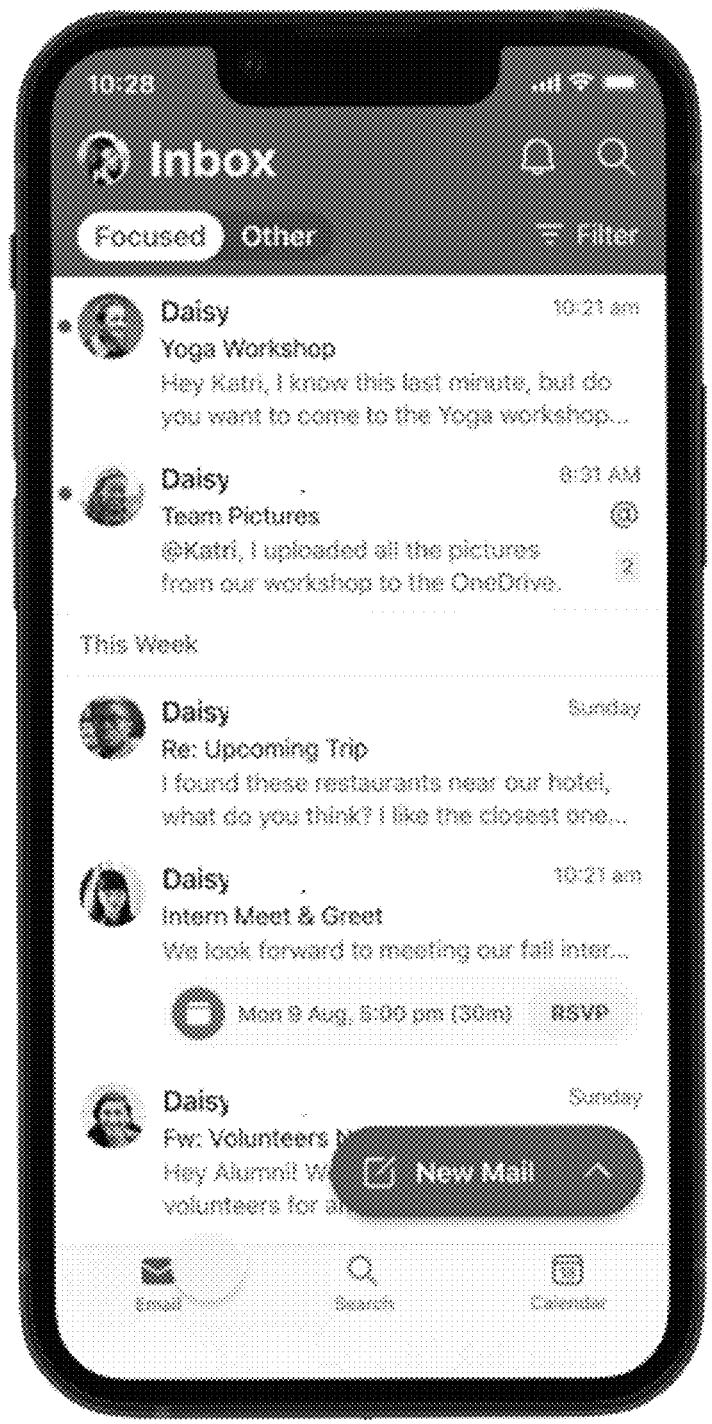

FIG. 18 shows that the user interface system 120 on client system 104 has now navigated the user to the third most important new message represented by preview display element 442. A content summary 444 is generated from the email represented by preview display element 442, and the content summary 444 has connector 434 as visual indicia identifying the email from which the content summary 444 was generated. Also, the message sequence indicator 437 has been incremented to show that user 130 is now viewing the summary for the third and final new message for which a summary was created. When user 130 actuates the next actuator 436, user interface system 120 generates a final message 446, shown in FIG. 19. Message 446 indicates that user 130 has now reviewed all of the important new messages that have been received since the last time the user viewed his or her inbox. If the user 130 actuates the previous/next actuator 436, the user 130 will be navigated to the previously-shown content summary. However, if the user actuates the dismiss actuator 435, then the user's inbox will be shown, as illustrated in FIG. 20.

Figure 21:
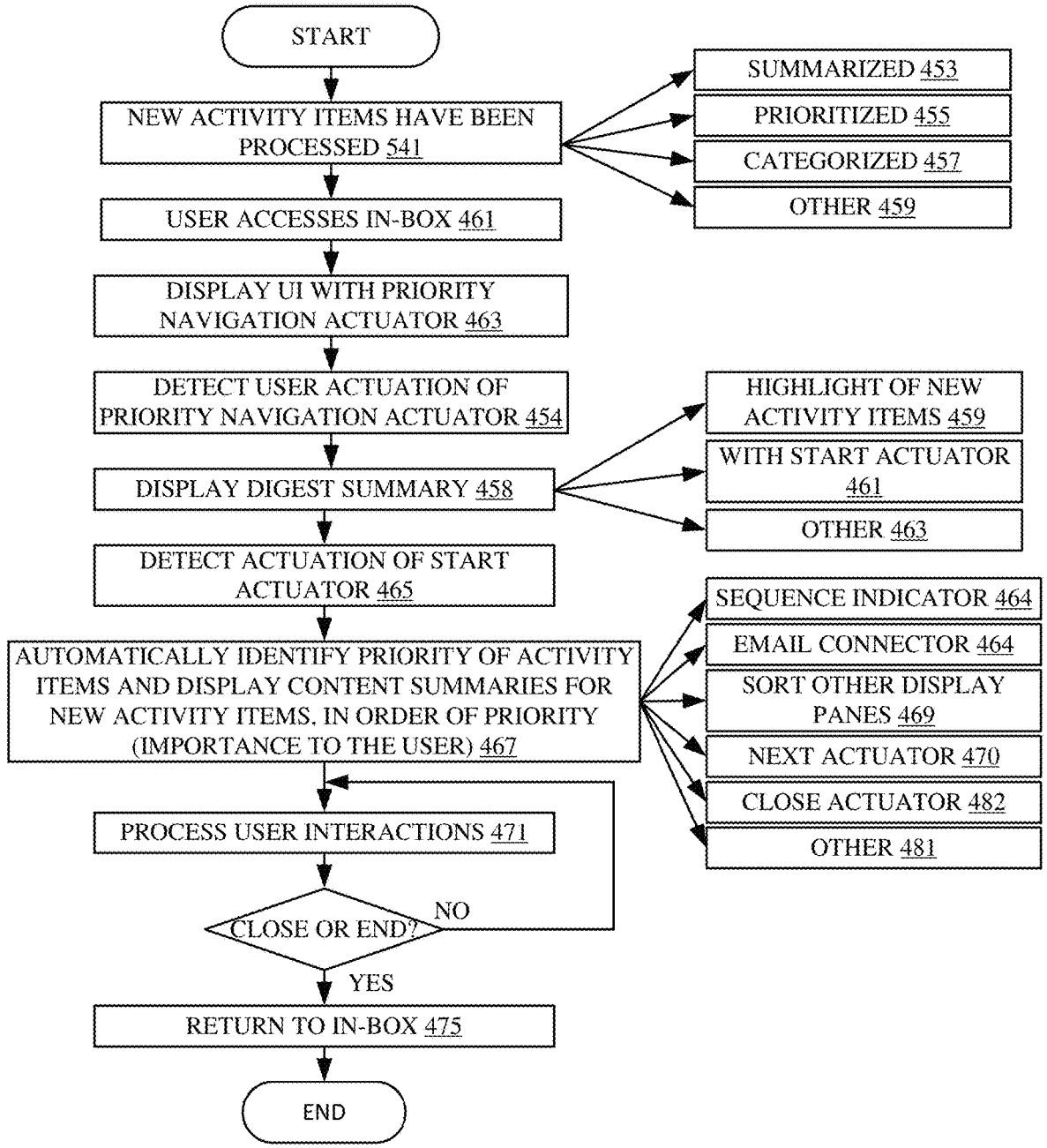
FIG. 21 is a flow diagram showing one example of the operation of a user interface system in a conducting a user experience.

FIG. 21 is a flow diagram showing an example of the operation of items in architecture 100 in controlling a set of user interfaces to conduct a new user experience. FIGS. 22-25 show additional examples of user interface displays that can be generated when conducting the user through a priority navigation user experience. FIGS. 21-25 will now be described in conjunction with one another.

Figure 22:
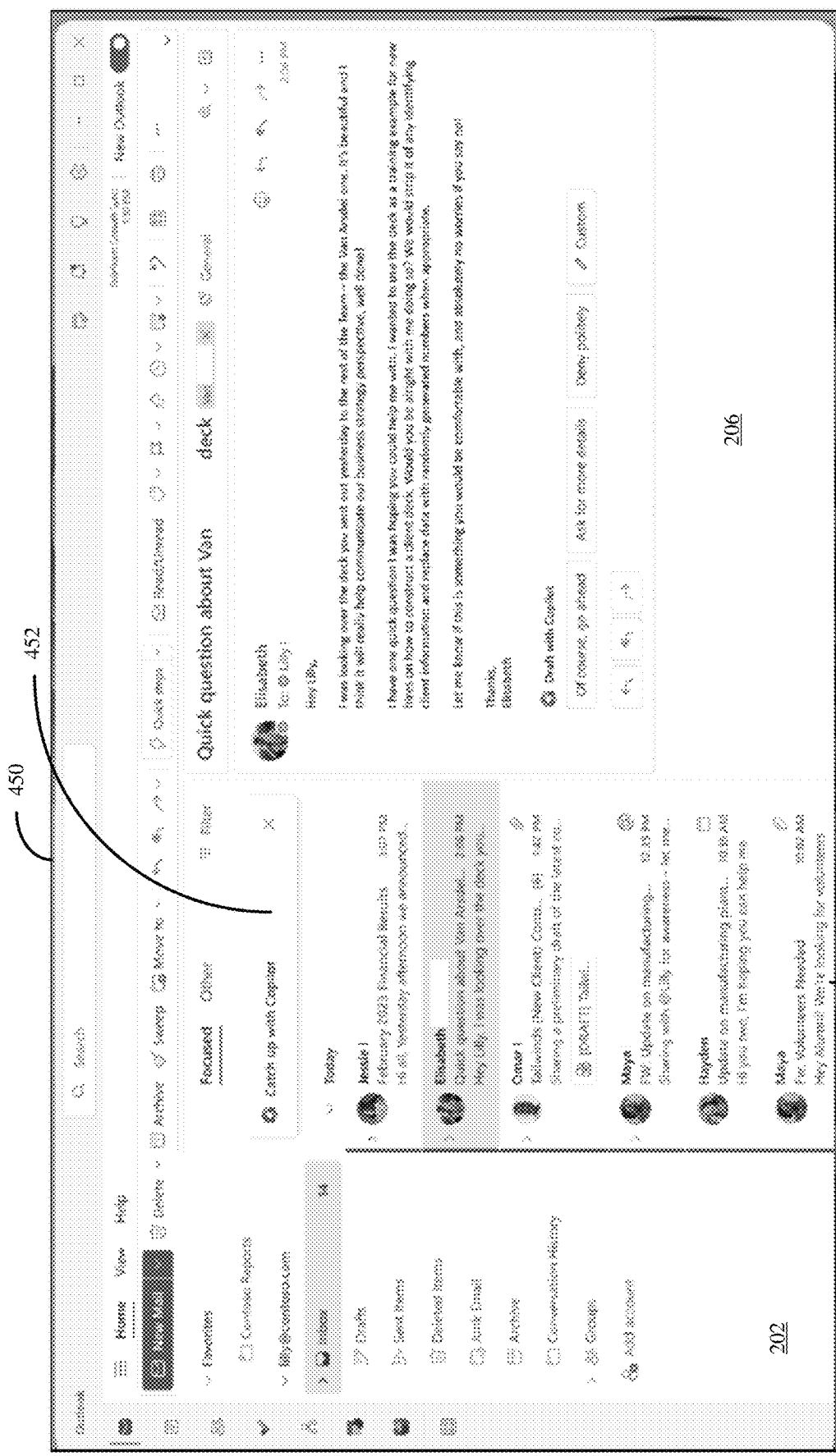
FIGS. 22, 23, 24, and 25 show examples of user interfaces that can be generated in conducting a user experience.

FIG. 22 shows a display 450 that has a folder pane 202, a highlight pane 204, and reading pane 206. FIG. 22 also assumes that new activity items (e.g., new email messages) that have been received since user 130 last checked his or her mailbox have been summarized, categorized, and prioritized (or at least prioritized) and/or processed in other ways, as indicated by blocks 451, 453, 455, 457, and 459 in the flow diagram of FIG. 21. It is also assumed that user 130 has now logged back into (or otherwise accessed) his or her inbox, as indicated by block 461 in FIG. 21. Display 450 shows that user interface system 120 displays a priority navigation actuator 452 which can be actuated by user 130 in order to invoke user interface system 120 to conduct the priority navigation user experience navigating user 130 through the new email messages that user 130 has received, in rank or priority order. Again, it will be noted that the summaries and priorities may already have been downloaded from electronic message server system 106 to client system 104, or the summaries and priorities can be downloaded in response to user 130 accessing his or her email system or in response to other actions. For the purposes of the present discussion, it will be assumed that the email messages have already been summarized and prioritized and the summaries and priorities along with any other items (such as the emails themselves, etc.) have already been sent from electronic message server system 106 to client system 104 for presentation to user 130.

Figure 23:
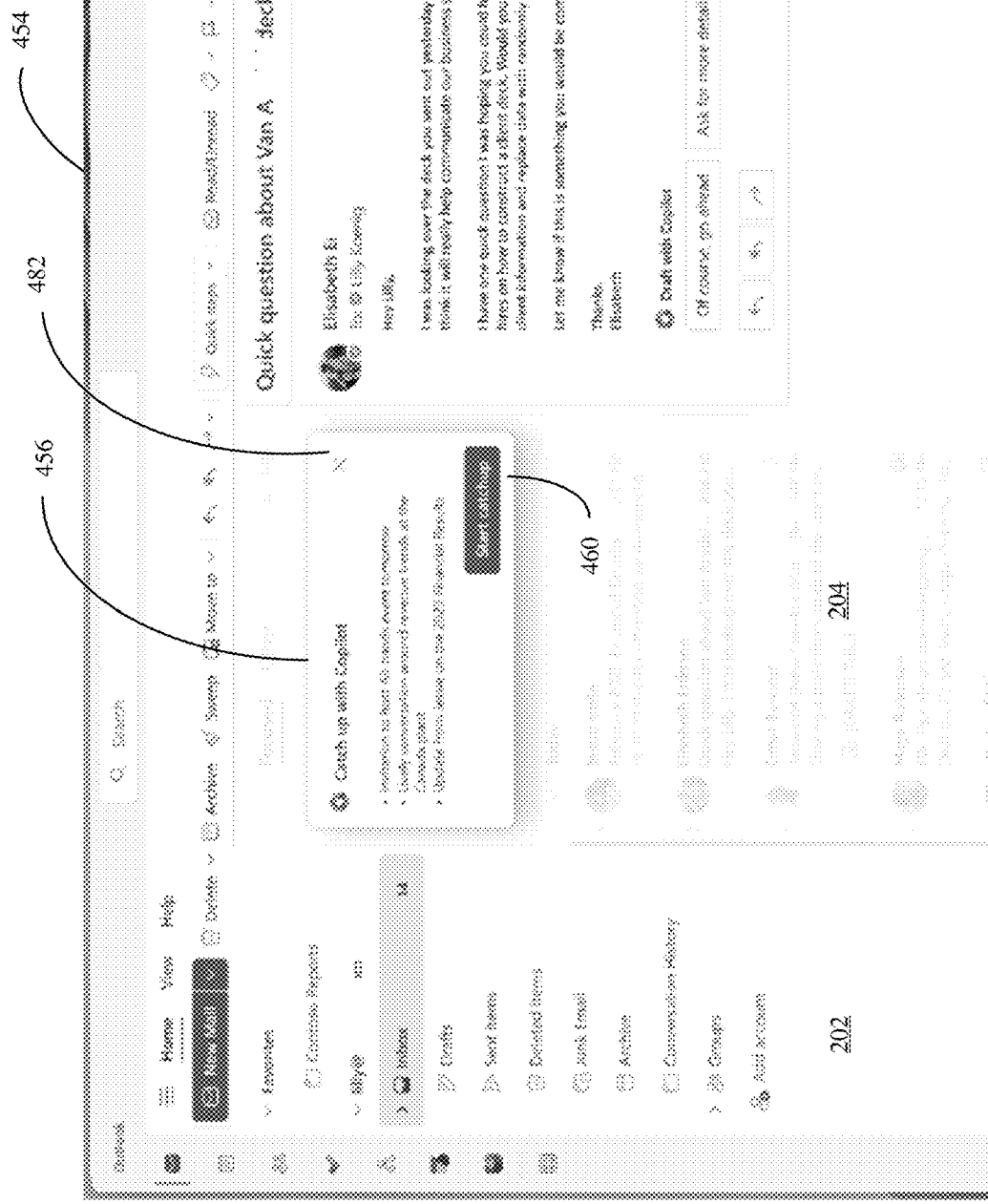

Once user 130 actuates the priority navigation actuator 452, as indicated by block 454 in the flow diagram of FIG. 21, user interface system 120 begins the priority navigation user experience by generating a display 454, illustrated in FIG. 23. FIG. 23 shows that user interface system 120 has now displayed a digest summary 456, as indicated by block 458 in the flow diagram of FIG. 21. Digest summary 456 includes a textual description highlighting the new activity items (e.g., the new email messages) that have been received (as indicated by block 459 in FIG. 21) and also includes a start actuator 460 which can be actuated by user 130 to begin having user interface system 120 navigate user 130 through those email messages (as indicated by block 461 in FIG. 21). The digest summary 456 can include other items as well, as indicated by block 463 in the flow diagram of FIG. 21.

When the user 130 actuates the start actuator 460 (as indicated by block 465 in FIG. 21), user interface system 120 begins automatically identifying the priorities of the new activity items (e.g., the new email messages) and displaying content summaries for the activity items (e.g., the new email messages), in order of priority (as indicated by block 467 in FIG. 21). By automatically it is meant, for example, that the system performs the step, operation, or function without further human involvement except, perhaps, to initiate or authorize the step, operation, or function.

Figure 24:
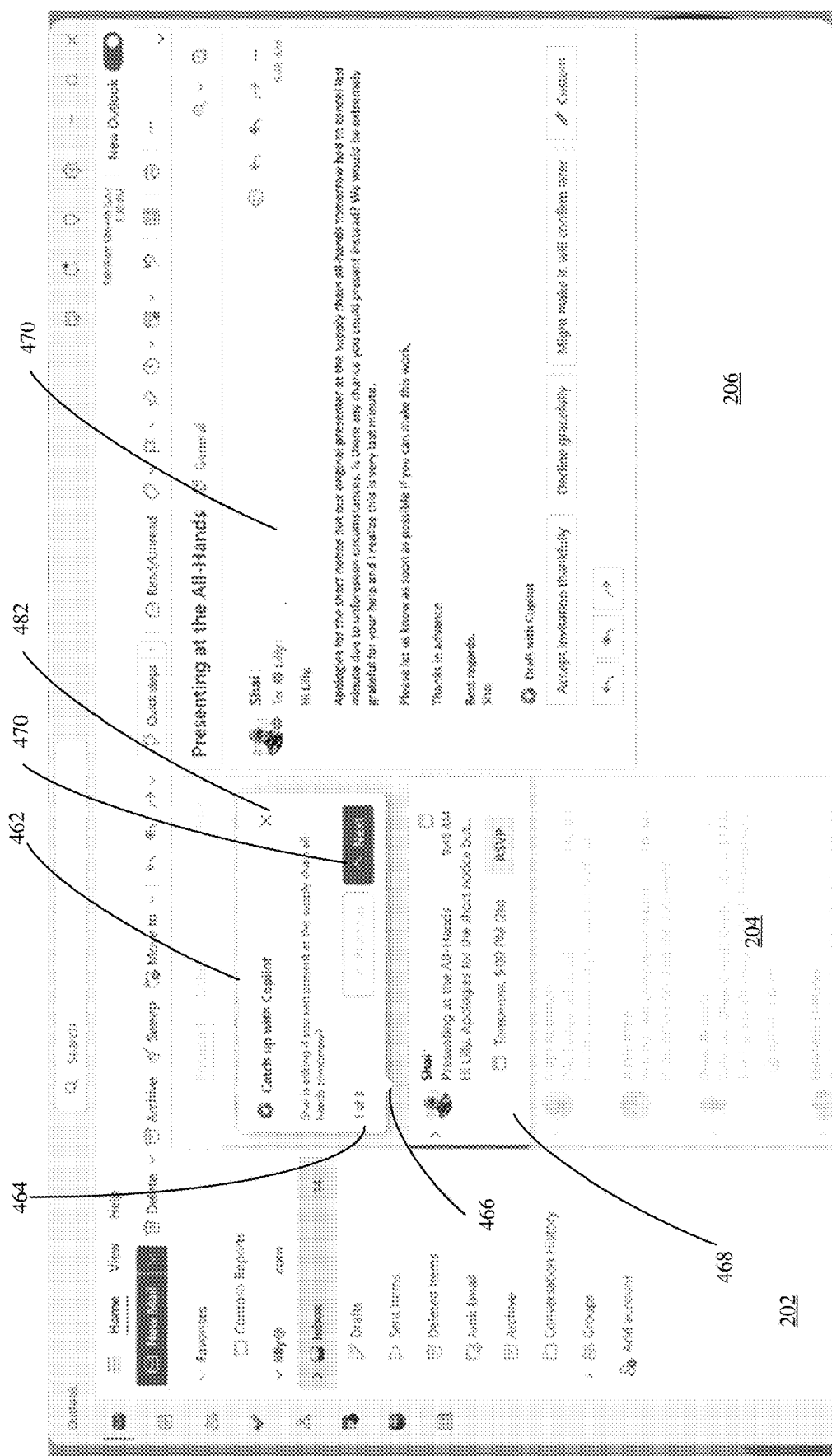

FIG. 24 shows one example in which a content summary 462 is displayed. Content summary 462 summarizes the content of an email and includes message sequence indicator 464 indicating that this is one of three new messages that will be summarized for user 130. Summary 462 also includes an email connector 466 that visually shows that summary 462 is generated from the email represented by preview display element 468. Similarly, the reading pane 206 has been sorted to show the email 470 that is represented by summary display element 468. Sorting is indicated by block 469 the flow diagram of in FIG. 21. Content summary 462 also includes a next actuator 470 and a close actuator 482. Actuator 470 can be actuated by user 130 to navigate to the next most important new message, in which case the user interface system 120 displays a content summary for that email message. Actuator 482 can be actuated to close the priority navigation user experience, in which case user interface system 120 displays the user's inbox. Content summary 462 can include other items 481 as well.

Figure 25:
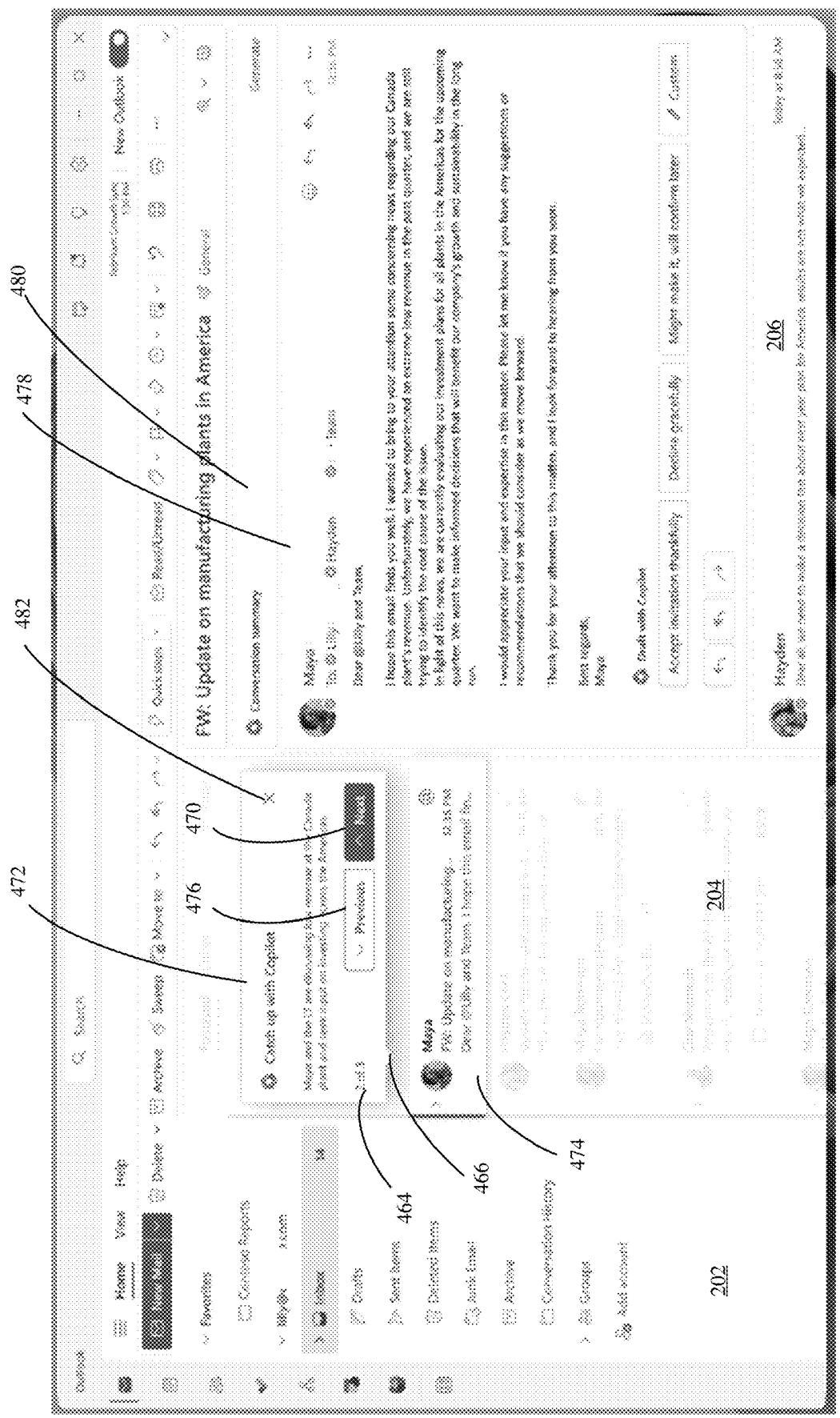

FIG. 25 shows that the user has actuated the next actuator 470 shown in FIG. 24 so that the user interface system 120 now displays a content summary 472 for the next most important email message, which is represented by preview display element 474. Some of the items on content summary 472 are similar to those shown for content summary 462 in FIG. 24, and they are similarly numbered. Content summary 472 also includes a previous actuator 476 which can be actuated by user 130 to navigate back to the content summary for the previously-shown email message.

FIG. 25 also shows that the reading pane 206 has now been sorted to show the email message 478 represented by the preview display element 474. Reading pane 206 also displays related email messages, and includes a summary generation actuator 480. Actuator 480 can be actuated by user 130 to obtain a summary of the conversation embodied in email 478 and the related emails in that conversation. When user 130 actuates actuator 480, then client system 104 can request a summary of the conversation from electronic message server system 106 which, itself, invokes one of the generative AI models to generate that summary and return it to client system 104.

Processing the various user interactions in the priority navigation user experience is indicated by block 471 in the flow diagram of FIG. 21. At any point during the user experience, user 130 can actuate a close actuator 482 on the content summary to return to the user's normal inbox view, as indicated by blocks 473 and 475 in the flow diagram of FIG. 21.

It will be appreciated that the example user experiences described above are examples only. A wide variety of other user experiences can be provided, in which the user is navigated to summaries for important email messages, in a rank order or an order of priority that is based upon the priority assigned by electronic message server system 106. Again, the user interface system 120 on client system 104 can modify that order or assign a different order, but the user is illustratively navigated through the messages, in rank order, showing the message content summaries.

The present discussion thus describes a system which greatly enhances the operation of an electronic message system in that important new messages are identified based on user context information, and those messages are summarized and ranked in order of importance to the user 130. The user 130 is then navigated through the summaries, in order of importance. This significantly reduces the computer system resources consumed by the electronic message system because the important messages are both identified and summarized for the user so that the user may not even need to open those messages to identify what actions need to be taken. Similarly, the user does not need to open unimportant messages, which results in a reduction in the number of interactions that a client system needs to have with the electronic message server system. This leads to reduced bandwidth requirements for the electronic message server system and reduces network traffic.

It will be noted that the above discussion has described a variety of different systems, components, processors, identifiers, generators, and/or logic. It will be appreciated that such systems, components, processors, identifiers, generators, and/or logic can be comprised of hardware items (such as processors and associated memory, or other processing components, some of which are described below) that perform the functions associated with those systems, components, processors, identifiers, generators, and/or logic. In addition, the systems, components, processors, identifiers, generators, and/or logic can be comprised of software that is loaded into a memory and is subsequently executed by a processor or server, or other computing component, as described below. The systems, components, processors, identifiers, generators, and/or logic can also be comprised of different combinations of hardware, software, firmware, etc., some examples of which are described below. These are only some examples of different structures that can be used to form the systems, components, processors, identifiers, generators, and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 26:
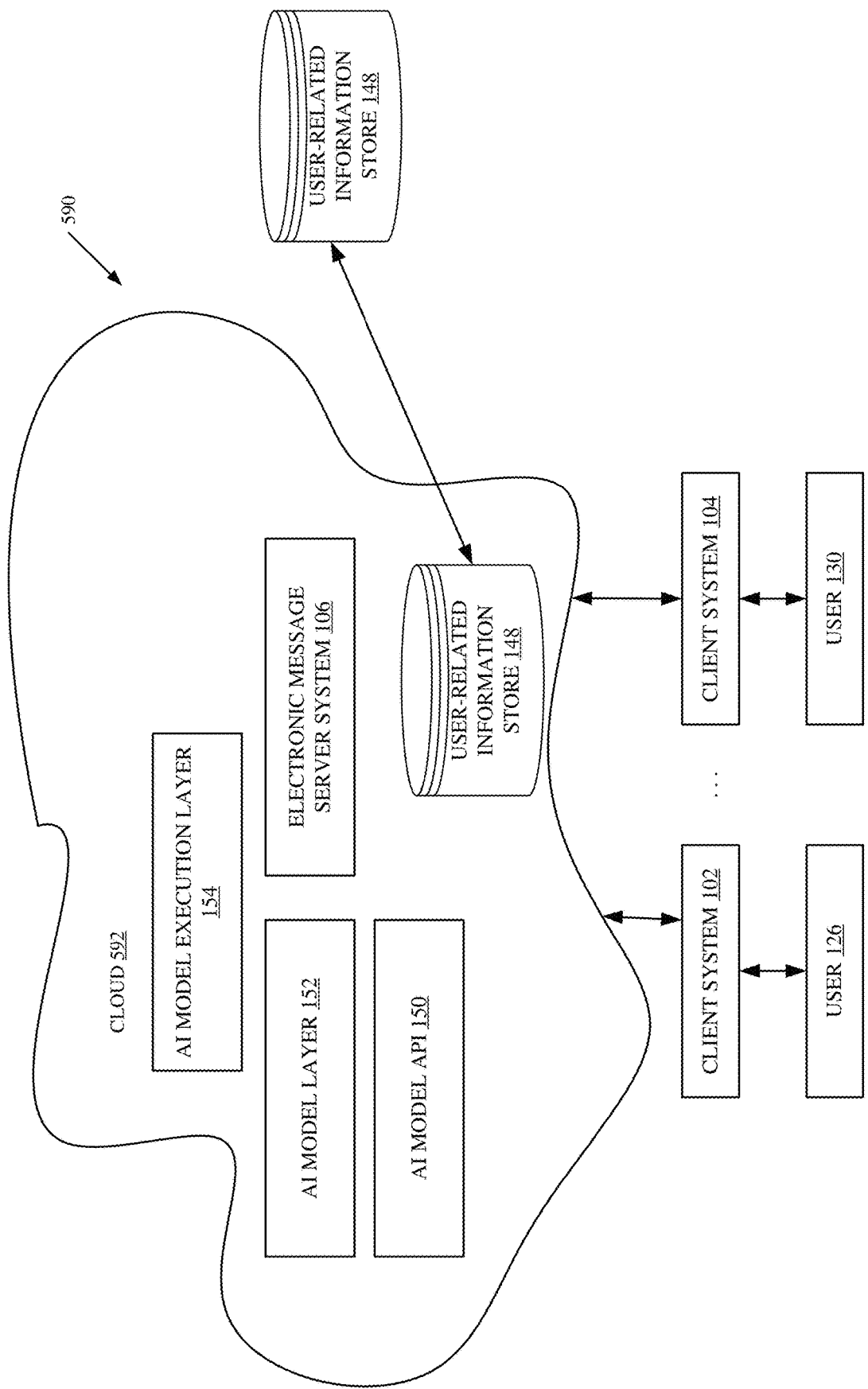
FIG. 26 shows the architecture illustrated in FIG. 1, deployed in a remote server architecture.

FIG. 26 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 26, some items are similar to those shown in FIG. 1 and they are similarly numbered. FIG. 26 specifically shows that system 106, layers 152 and 154, and data store 148 can be located in cloud 502 (which can be public, private, or a combination where portions are public while others are private). Therefore, users 126 and 130 use user devices that implement client systems 102 and 104 to access those systems through cloud 502.

FIG. 26 also depicts another example of a cloud architecture. FIG. 26 shows that it is also contemplated that some elements of architecture 100 can be disposed in cloud 502 while others are not. By way of example, data store 148 can be disposed outside of cloud 502, and accessed through cloud 502. Regardless of where the items are located, the items can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 27:
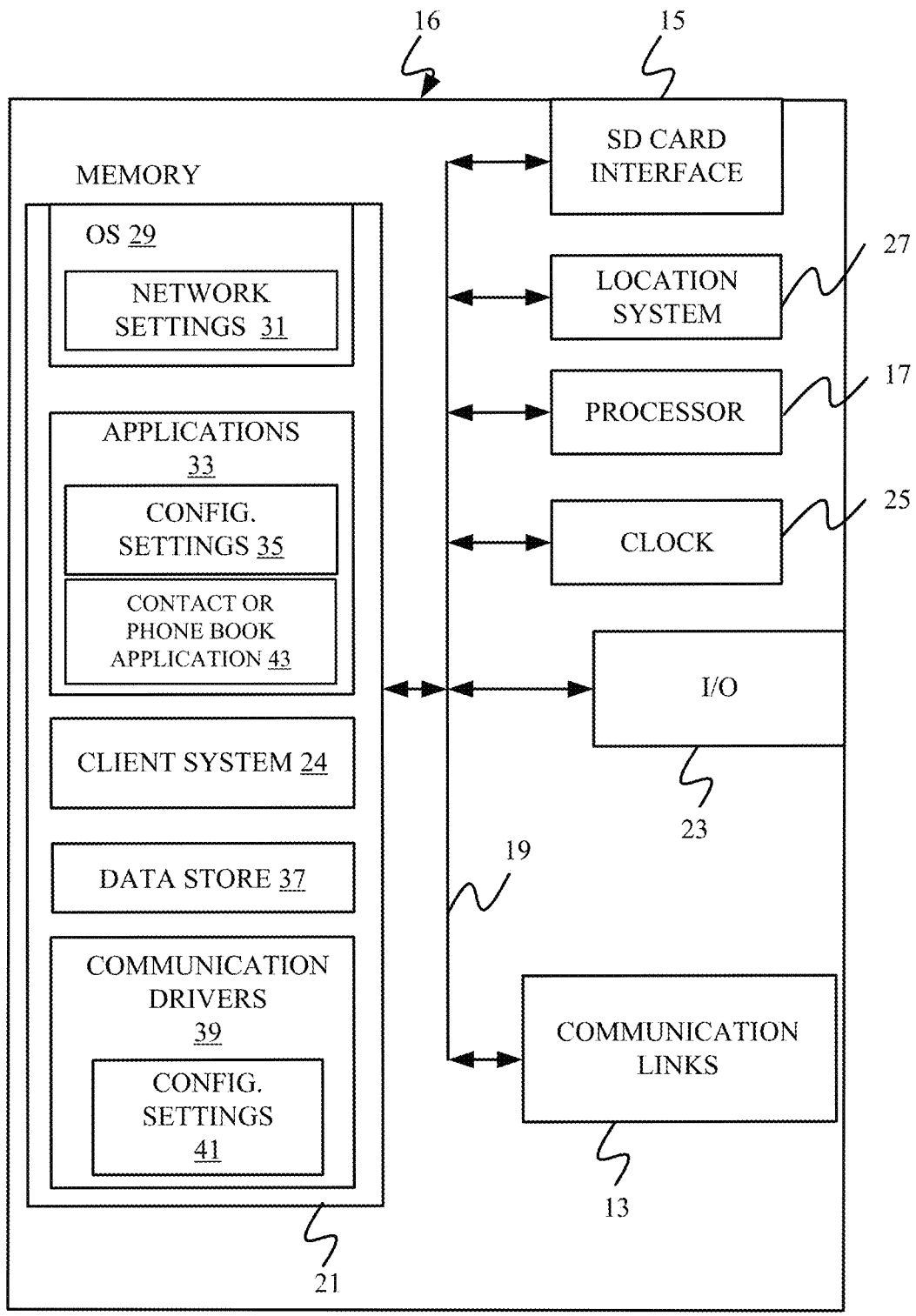
FIGS. 27, 28, and 29 show examples of mobile devices that can be used in the architectures described with respect to other figures.
Figure 28:
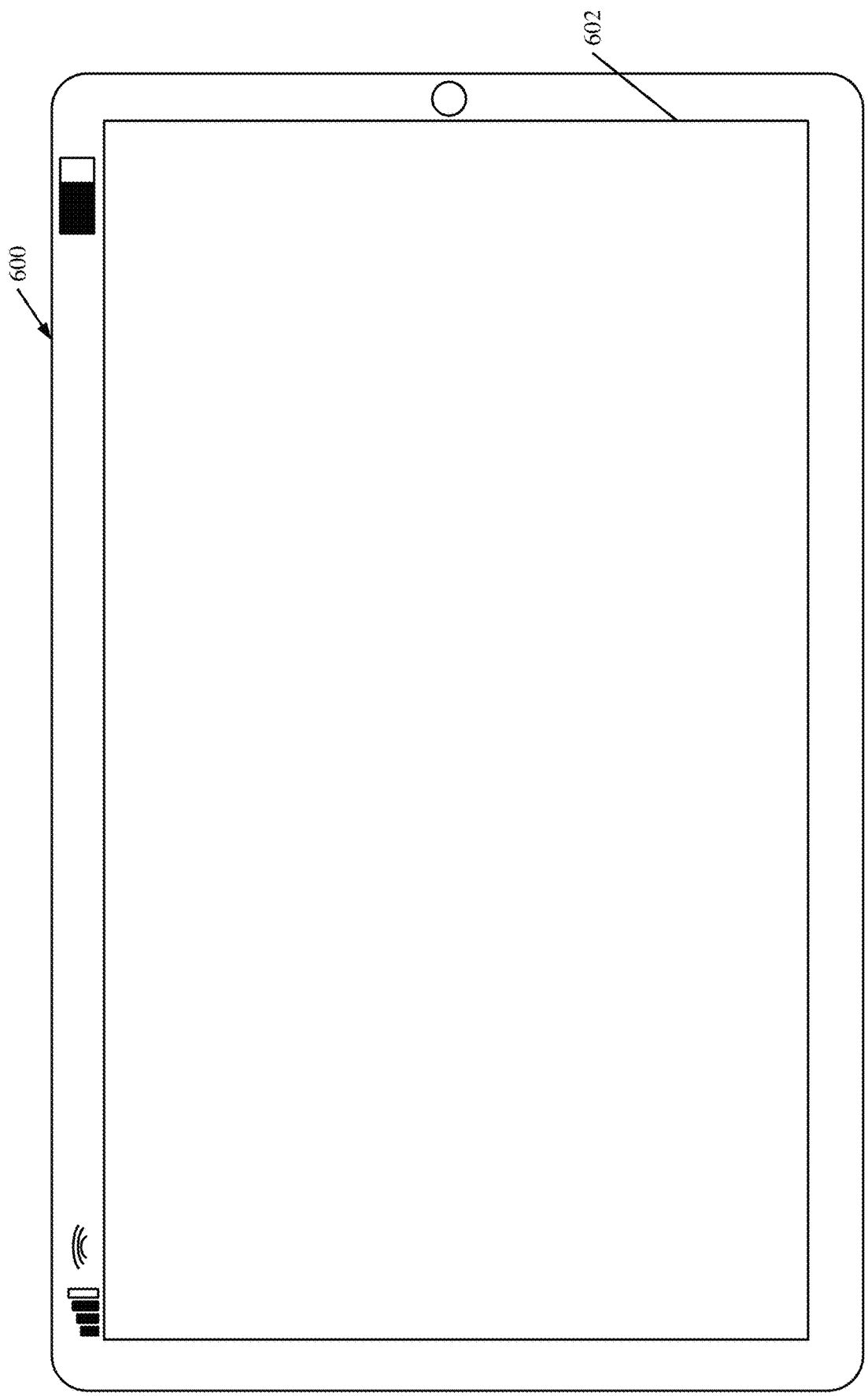
Figure 29:
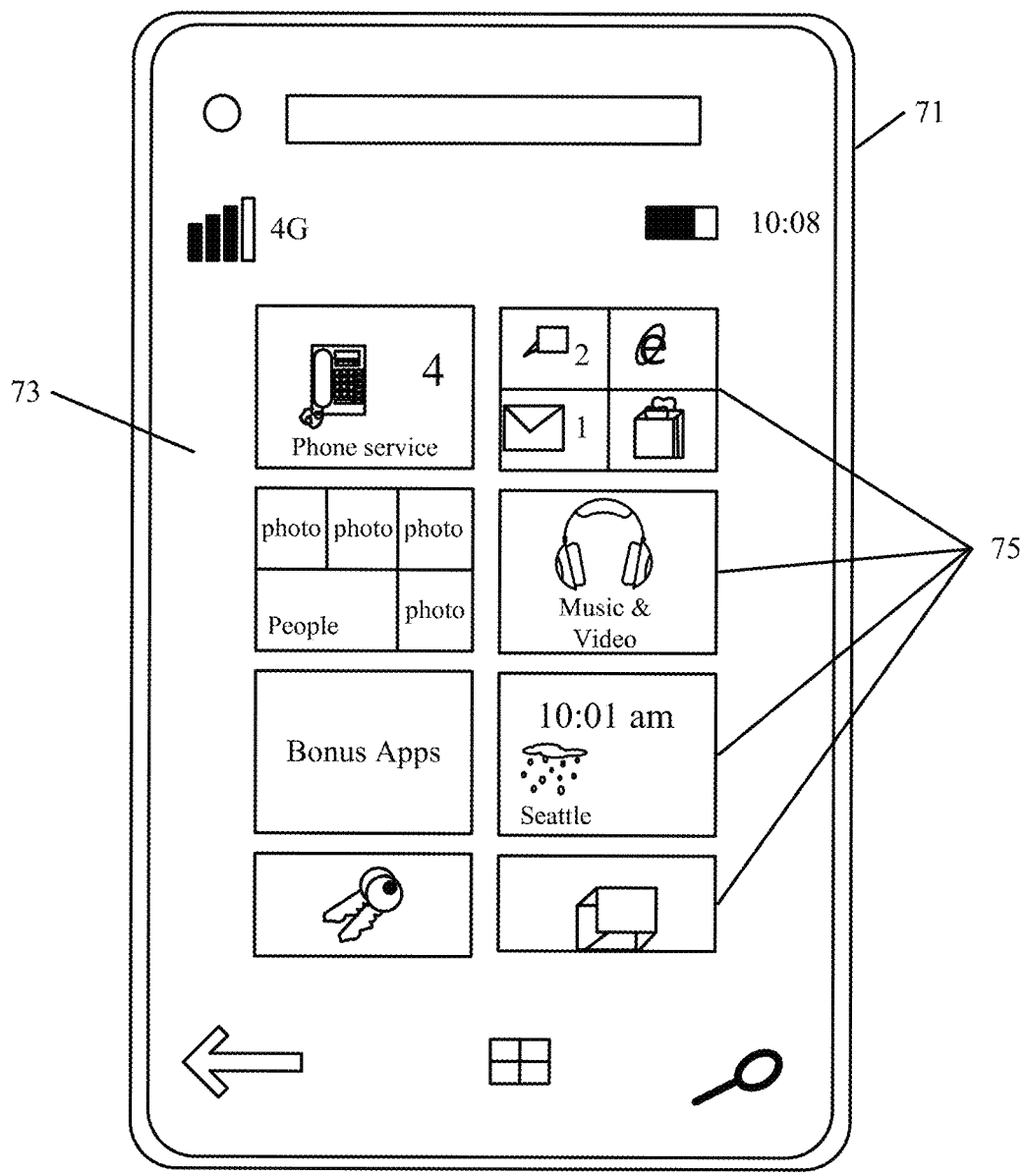

FIG. 27 is a simplified block diagram of one illustrative example of a handheld or mobile computing device that can be used as a user's or client's hand held device 16, in which the present system (or parts of it) can be deployed. FIGS. 28-29 are examples of handheld or mobile devices.

FIG. 27 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 28 shows one example in which device 16 is a tablet computer 600. In FIG. 28, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 29 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 30:
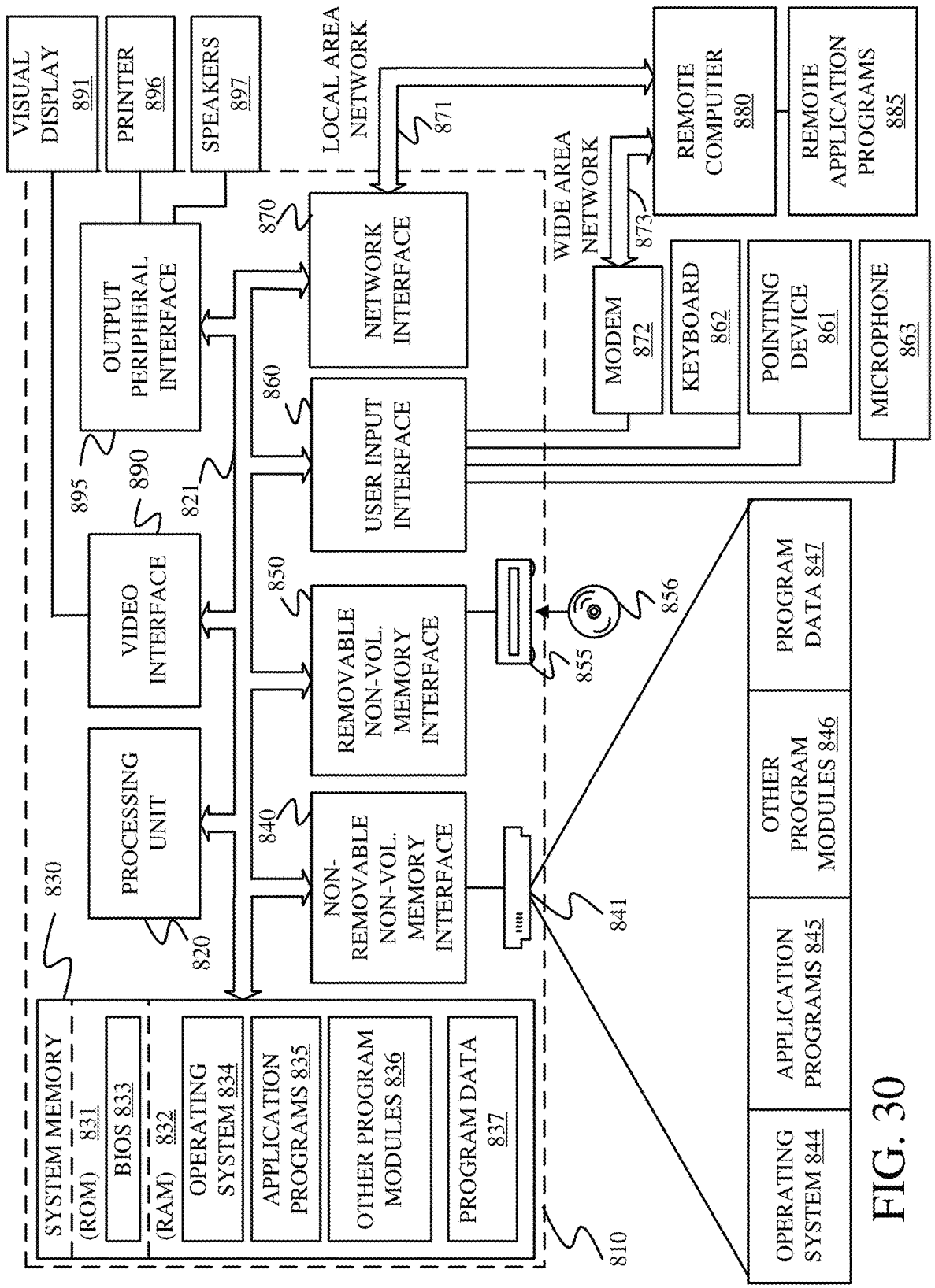
FIG. 30 is a block diagram showing one example of a computing environment that can be used with respect to other systems and architectures described herein.

FIG. 30 is one example of a computing environment in which architecture 100, or parts of it, (for example) can be deployed. With reference to FIG. 30, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 30.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 30 illustrates operating system 834, application programs 835, other program modules 836, and program data 837.

The computer 810 may also include other removable/non-removable volatile/nonvolatile computer storage media. By way of example only, FIG. 30 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 30, provide storage of computer readable instructions, data structures, program modules and other data for the computer 810. In FIG. 30, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 30 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 30 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
    identifying a plurality of activity items received at an electronic message server for a user, where a first activity item of the plurality of activity items includes an unread electronic message;
    obtaining, from a user device connected to the electronic message server, user context information associated with the user indicating at least one of: user actions taken during interactions with electronic messages of the electronic message server, categories of interest to the user, a location associated with the user, a recency associated with the user interactions with the electronic messages of the electronic message server, and a timeliness of responses to the electronic messages of the electronic message server, or any combination thereof;
    causing a generative artificial intelligence model to generate a content summary corresponding to the electronic message associated with the first activity item;
    prompting the generative artificial intelligence model, with the user context information and the content summary corresponding to the first activity item, to determine a priority for the first activity item, the priority indicating an importance to the user of the first activity item relative to at least one other activity item of the plurality of activity items, the priority determined based on the user context information and the content summary, where the user context information indicates the importance to the user;
    assigning the priority to the content summary; and
    causing a client system to display the first activity item including the content summary in a user interface based on the priority.

2. The computer implemented method of claim 1 wherein prompting the generative artificial intelligence model to obtain a separate priority for each content summary comprises:
    assigning each new activity item to a category of interest, of a plurality of categories of interest, corresponding to the user; and
    prompting the generative artificial intelligence model with the category of interest to which the new activity item corresponding to the content summary is assigned.

3. The computer implemented method of claim 1 wherein accessing the generative artificial intelligence model comprises:
    prompting the generative artificial intelligence model with the plurality of activity items and the user context information.

4. The computer implemented method of claim 2 and further comprising:
    receiving at the electronic message server, from the client system, an indication that the user has accessed a hosted electronic message application hosted by the electronic message server.

5. The computer implemented method of claim 4 and further comprising:
    based on the indication that the user has accessed the hosted electronic message application hosted by the electronic message server, sending the client system the content summaries, and assigned priorities.

6. The computer implemented method of claim 4 and further comprising:
    accessing the generative artificial intelligence model to obtain a digest summary based on the plurality of activity items.

7. The computer implemented method of claim 6 and further comprising:
    based on the indication that the user has accessed the hosted electronic message application hosted by the electronic message server, sending the client system the digest summary.

8. The computer implemented method of claim 4 and further comprising:
    prompting a category identifying generative artificial intelligence model with the user context information; and
    receiving from the category identifying generative artificial intelligence model an indication of the plurality of categories of interest corresponding to the user.

9. The computer implemented method of claim 8 and further comprising:
    generating a separate importance summary corresponding to each category of interest based on the plurality of activity items assigned to the corresponding category of interest; and
    based on the indication that the user has accessed the hosted electronic message application hosted by the electronic message server, sending the client system the importance summary for each category.

10. The computer implemented method of claim 9 wherein generating the separate importance summary corresponding to each category of interest comprises:
    calling the generative artificial intelligence model with the user context information and information indicative of the plurality of activity items assigned to each category; and
    receiving the importance summary for each category from the generative artificial intelligence model.

11. A computer system, comprising:
    at least one processor; and
    a memory storing computer executable instructions which, when executed by the at least one processor, cause the at least one processor to perform a method, comprising:
    receiving a call at a message server, from a client, the call including an indication that a user has accessed a message application hosted by the message server maintaining an unread electronic mail message;
    obtaining, from the client, user context information associated with the user indicating at least one of: user actions taken in response to electronic mail messages obtained by the message server on behalf of the user, categories of interest to the user, a location associated with the user, a recency associated with user interactions with the message server, and a timeliness of responses to the message server, or any combination thereof;

calling a generative artificial intelligence model with the user context information to obtain a set of summaries and corresponding importance indicators, one summary of the set of summaries corresponding to the unread electronic mail message;

causing the generative artificial intelligence model to, based on the user context information associated with the user, generate an importance indicator being indicative of an importance of the one summary to the user;

sending the set of summaries and the importance indicator to the client; and causing the client to display the set of summaries in a user interface based on the importance indicator.

12. The computer system of claim 11 wherein the computer executable instructions, when executed by the at least one processor, cause the at least one processor to perform the method further comprising:

accessing the generative artificial intelligence model to obtain a digest summary based on new activity items extracted from a plurality of unread electronic mail messages by the generative artificial intelligence model.

13. The computer system of claim 12 wherein the computer executable instructions, when executed by the at least one processor, cause the at least one processor to perform the method further comprising:

based on the indication that the user has accessed the message application hosted by the message server, sending the client the digest summary.

14. The computer system of claim 11 wherein the computer executable instructions, when executed by the at least one processor, cause the at least one processor to perform the method further comprising:

prompting a generative artificial intelligence model with the user context information; and receiving from the generative artificial intelligence model a set of categories of interest corresponding to the user; and assigning each of the summaries to one of the categories of interest and wherein calling the generative artificial intelligence model with the user context information to obtain corresponding importance indicators comprises prompting the generative artificial intelligence model with a category indicator for each summary, the category indicator indicating the category of interest to which the summary is assigned, and obtaining the corresponding importance indicator from the generative artificial intelligence model.

15. A computing system comprising:

at least one processor; and a memory storing instructions executable by the at least one processor, wherein the instructions, when executed, cause the computing system to:

identify a plurality of activity items received at an electronic message server for a user, the plurality of activity items associated with electronic messages of the electronic message server, where a first activity item of the plurality of activity items includes an unseen electronic message;

obtain, from a user device, user context information indicating at least one of: user actions taken in response to the electronic messages of the electronic message server based on a set of electronic messages that have been seen by the user, categories of interest to the user, a location associated with the user, a recency associated with user interactions with the electronic messages of the electronic message server, and a timeliness of responses to the electronic messages of the electronic message server, or any combination thereof;

access a generative artificial intelligence model to obtain a set of content summaries, where a content summary of the set of content summaries corresponds to the first activity item associated with the unseen electronic message;

prompt the generative artificial intelligence model, with the user context information and the content summary, to obtain a priority for first activity item corresponding to the content summary, the priority being indicative of an importance of the first activity item corresponding to the content summary;

assign the priority to the content summary; and causing a client system to display the first activity item including the content summary in a user interface based on the priority.

16. The computing system of claim 15, wherein the instructions, when executed, cause the computing system to:

assign the first activity item to a category of interest, of a plurality of categories of interest, corresponding to the user; and prompt the generative artificial intelligence model with the category of interest to which the first activity item corresponding to the content summary is assigned.

17. The computing system of claim 15, wherein the instructions, when executed, cause the computing system to:

prompt the generative artificial intelligence model with the plurality of activity items and the user context information.

18. The computing system of claim 16, wherein the instructions, when executed, cause the computing system to:

receive at the electronic message server, from the client system, an indication that the user has accessed a hosted electronic message application hosted by the electronic message server.

19. The computing system of claim 18, wherein the instructions, when executed, cause the computing system to:

based on the indication that the user has accessed the hosted electronic message application hosted by the electronic message server, send the client system the set of content summaries, and assigned priorities.

20. The computing system of claim 18, wherein the instructions, when executed, cause the computing system to:

access the generative artificial intelligence model to obtain a digest summary based on all the plurality of activity items.

* * * * *